(12) United States Patent
Saito

(10) Patent No.: US 7,869,096 B2
(45) Date of Patent: *Jan. 11, 2011

(54) TABLE CREATION METHOD, TABLE CREATION APPARATUS, STORAGE MEDIUM, AND PROGRAM

(75) Inventor: Kazuhiro Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 950 days.

This patent is subject to a terminal disclaimer.

(21) Appl. No.: 11/555,100

(22) Filed: Oct. 31, 2006

(65) Prior Publication Data

US 2007/0070464 A1    Mar. 29, 2007

Related U.S. Application Data

(62) Division of application No. 10/262,962, filed on Oct. 3, 2002, now Pat. No. 7,193,747.

(30) Foreign Application Priority Data

Oct. 4, 2001    (JP) .............................. 2001/308645

(51) Int. Cl.
G06K 15/00 (2006.01)
H04N 1/40 (2006.01)
H04N 1/60 (2006.01)

(52) U.S. Cl. ....................................... 358/3.23; 358/1.9

(58) Field of Classification Search ................ 358/3.23, 358/1.9, 1.1
See application file for complete search history.

(56) References Cited

U.S. PATENT DOCUMENTS

| 4,346,402 | A | 8/1982 | Pugsley | 358/523 |
|---|---|---|---|---|
| 4,929,978 | A | 5/1990 | Kanamori et al. | 355/38 |
| 5,315,415 | A | 5/1994 | Kawai et al. | 358/515 |
| 5,390,035 | A | 2/1995 | Kasson et al. | 358/518 |
| 5,689,350 | A | 11/1997 | Rolleston | 358/504 |
| 5,764,387 | A | 6/1998 | Yamada | 358/525 |
| 5,930,388 | A | 7/1999 | Murakami et al. | 382/167 |
| 5,978,011 | A | 11/1999 | Jacob et al. | 358/525 |
| 6,169,609 | B1 | 1/2001 | Jacob et al. | 358/1.9 |
| 6,285,501 | B1 | 9/2001 | Suzuki | 359/554 |
| 6,389,161 | B1 | 5/2002 | Krabbenhoft | 382/167 |
| 6,571,010 | B1 | 5/2003 | Inoue | 382/162 |
| 6,587,223 | B1 | 7/2003 | Yamaguchi | 358/1.9 |
| 6,922,197 | B2 | 7/2005 | Saito | 358/1.9 |
| 7,016,530 | B2 | 3/2006 | Saito et al. | 382/162 |

FOREIGN PATENT DOCUMENTS

EP    0 529 967 A2    8/1992

(Continued)

Primary Examiner—Douglas Q Tran
(74) Attorney, Agent, or Firm—Fitzpatrick, Cella, Harper & Scinto

(57) ABSTRACT

A distortion of a table which causes generation of a pseudo contour is removed. For this, there is disclosed a table creation method of creating a table for performing color separation into coloring material colors in an image forming apparatus, comprising the steps of creating a color separation table of a line in which a color reproduction area of the image forming apparatus is maximized, creating a color separation table in an inner line of the color reproduction area of the image forming apparatus, performing an interpolation process based on the created color separation tables, and smoothing the table obtained by the interpolation process to create the table.

12 Claims, 22 Drawing Sheets

FOREIGN PATENT DOCUMENTS

| | | |
|---|---|---|
| EP | 0 611 230 A1 | 2/1994 |
| EP | 0 611 231 A1 | 2/1994 |
| EP | 0674 430 A1 | 3/1995 |
| EP | 0 820 189 A2 | 6/1997 |
| EP | 1 083 739 A2 | 9/2000 |
| EP | 1 173 004 A2 | 7/2001 |
| JP | 2000-214386 A | 8/2000 |
| JP | 2006-060377 A | 3/2006 |

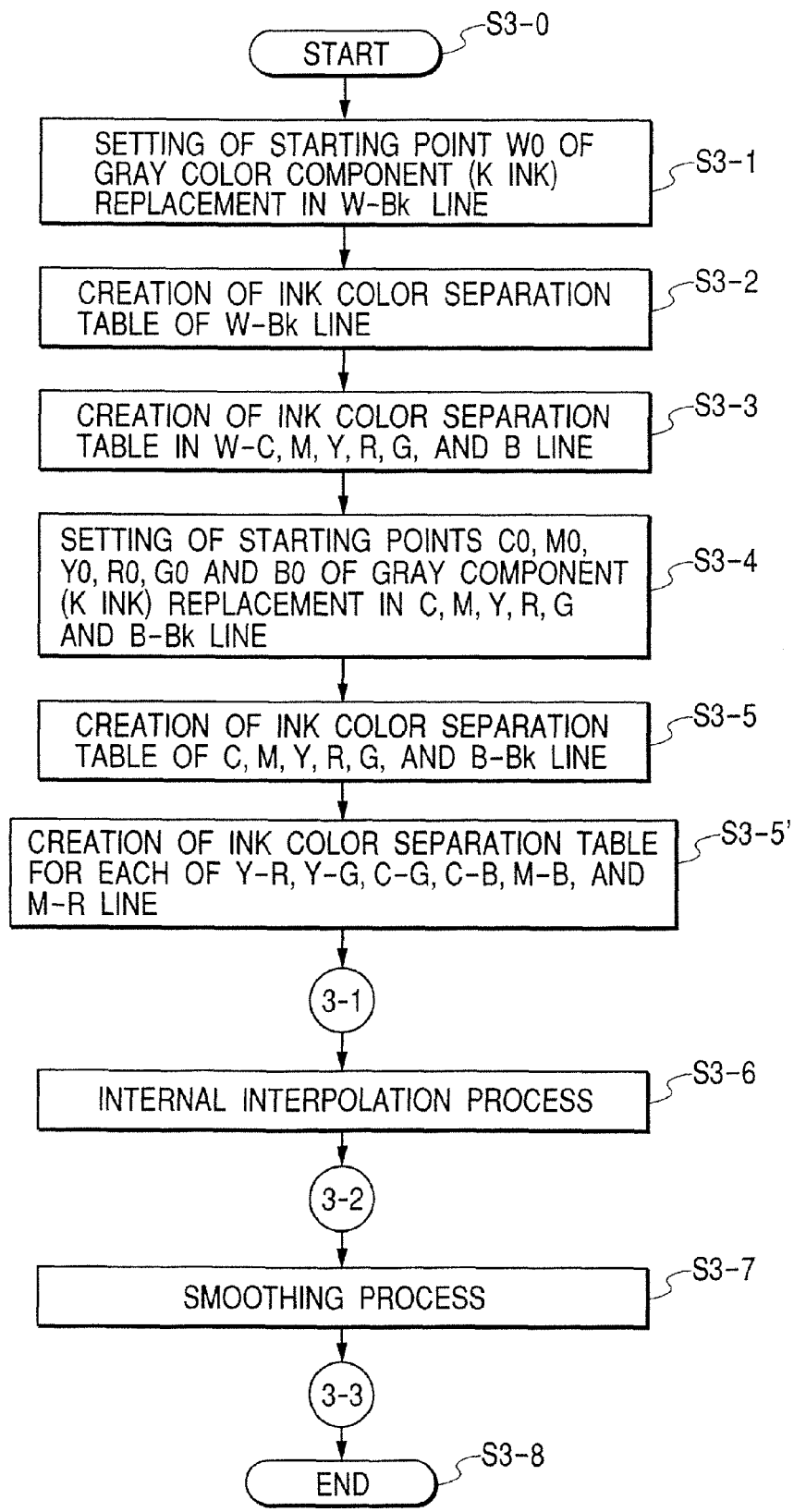

FIG. 20

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 3 | 2 | 1 |
| 0 | 0 | 0 | 0 | 0 | 5 | 12 | 8 | 9 |
| 0 | 0 | 0 | 7 | 6 | 13 | 15 | 19 | 23 |
| 0 | 0 | 4 | 13 | 13 | 15 | 18 | 20 | 25 |

FIG. 21

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 1 | 1 | 1 |
| 0 | 0 | 0 | 0 | 0 | 1 | 1 | 2 | 2 |
| 0 | 0 | 0 | 1 | 1 | 1 | 2 | 2 | 3 |
| 0 | 0 | 1 | 2 | 2 | 2 | 2 | 3 | 3 |

FIG. 22

| a1 | a2 | a3 |
|----|----|----|
| a4 | a5 | a6 |
| a7 | a8 | a9 |

FIG. 23

| $\alpha$ | $\alpha$ | $\alpha$ |
|----------|----------|----------|
| $\alpha$ | $\beta$  | $\alpha$ |
| $\alpha$ | $\alpha$ | $\alpha$ |

TABLE CREATION METHOD, TABLE CREATION APPARATUS, STORAGE MEDIUM, AND PROGRAM

CROSS REFERENCE TO RELATED APPLICATION

This application is a division of U.S. application Ser. No. 10/262,962, filed on Oct. 3, 2002, the entire disclosure of which is incorporated by reference herein.

BACKGROUND OF THE INVENTION

1. Field of the Invention

The present invention relates to a table creation method, table creation apparatus, storage medium, and program.

2. Description of the Related Art

As a conventional technique, a table creation method for creating a color separation table into coloring material colors has already been proposed by the present applicant which includes: a method of creating a gray line color separation table 1 into black from white; a method of creating a plurality of color separation tables 2 into primary and secondary colors from white; a method of creating a plurality of color separation tables 3 into black from the primary and secondary colors; and a method of performing an interpolation process to obtain table data among the color separation tables 1, 2, 3 based on the tables (Japanese Patent Application No. 2000-214386).

The interpolation process method comprises: dividing a color space constituted of a cube into six tetrahedron areas; and subjecting each area to the interpolation process.

However, the above-described conventional example comprising: dividing the color space constituted of the cube into six tetrahedron areas; and subjecting each area to the interpolation process has a disadvantage that a pseudo contour is generated in an area boundary. Moreover, depending on the method of creating the color separation tables 1, 2, 3, distortion occurs in a partial area during an internal interpolation process, and a disadvantage occurs that the pseudo contour of a reproduced image is generated.

To solve the problem, an n×n filtering process is used with respect to a two-dimensional plane, and a smoothing process for inhibiting the pseudo contour from being generated by an n×n×n filtering process is used with respect to a three-dimensional space. However, simply by the n×n or n×n×n filtering process, values of a gray line (color separation table 1) which must not be changed, or a line defining a maximum chroma (color separation tables 2, 3) are changed, and there is a problem that the filtering process cannot simply be applied.

Furthermore, in the smoothing by the simple filtering process, there is a problem of deterioration of granularity caused by: 1) deviation of a gray component or dark ink replacement starting point; and 2) impaired smoothness in the gray component or dark ink replacement start.

SUMMARY OF THE INVENTION

An object of the present invention is to solve the above-described problems.

To achieve the object, according to the present invention, there is provided a table creation method of creating a table for performing color separation into coloring material colors in an image forming apparatus, comprising the steps of: creating a color separation table of a line in which a color reproduction area of the image forming apparatus is maximized; creating a color separation table in an inner line of the color reproduction area of the image forming apparatus; performing an interpolation process based on the created color separation tables; and smoothing the table obtained by the interpolation process to create the table.

Moreover, there is provided a table creation method of creating a table for performing color separation into coloring material colors in an image forming apparatus, comprising the steps of: creating a first color separation table into black from white; creating a second color separation table into primary and secondary colors from the white; creating a third color separation table into black from the primary and secondary colors; performing an interpolation process based on the first, second, and third color separation tables; and smoothing the table obtained by the interpolation process to create the table.

Furthermore, without changing the first, second, and third color separation tables, the value obtained by the interpolation is smoothed. Additionally, in the smoothing, a smoothing amount is controlled in accordance with at least one of a distance from a zero boundary and a distance from an outer frame. Moreover, by the smoothing, a value of an ink amount of zero printed by the image forming apparatus and a boundary with zero do not change. Furthermore, a smoothing amount is reduced in a dark ink or gray component replacement starting area, and the smoothing amount is increased in other areas. Additionally, after the smoothing, the values of the first, second, and third color separation tables are recovered back to states before the smoothing, and the values of the table other than the first, second, and third color separation tables are successively recovered and changed in accordance with distances from the first, second, and third color separation tables 1, 2, 3.

In the above-described constitution, with the use of the smoothing process together with a recovery process, without changing the value of the gray line which must not be changed (color separation table 1) or the line defining the maximum chroma (color separation tables 2, 3), it is possible to remove the distortion of the color separation table caused by the application of the interpolation process or the distortion caused by the internal interpolation process. Therefore, the inhibition of the pseudo contour of the reproduced image caused by the distortion of the color separation table is achieved.

Furthermore, to execute the smoothing process, since the smoothing amount is controlled in accordance with the distance from the zero boundary of the gray component or dark ink, the smoothing process of the color separation table can be realized without changing the gray component or dark ink replacement starting point and without impairing the smoothness in the gray component or dark ink replacement start.

BRIEF DESCRIPTION OF THE DRAWINGS

FIG. 3 is a flowchart showing a basic constitution of an ink color separation table creation unit 104 of FIG. 1;

FIG. 20 is a diagram showing the values of grid points in a quadrangle of the Gamut surface;

FIG. 21 is a diagram showing a distance table from the zero boundary in a case in which the values of the grid points in the quadrangle of the Gamut surface are values shown in FIG. 23;

FIG. 22 is a diagram showing a matrix which defines basic frequency characteristics of the smoothing in two dimensions;

FIG. 23 is a diagram showing a matrix for controlling a smoothing effect degree in two dimensions;

DESCRIPTION OF THE PREFERRED EMBODIMENTS

First Embodiment

Figure 1:
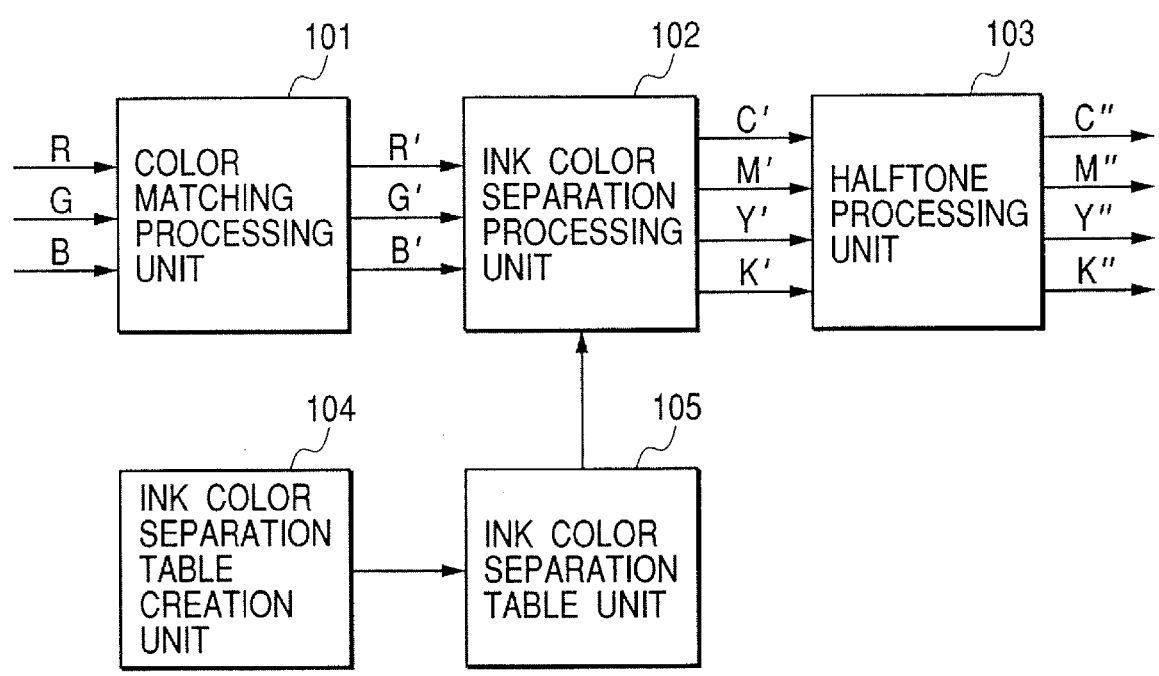
FIG. 1 is a diagram which best represents characteristics of a first embodiment and which shows a constitution including a color matching processing unit, ink color separation processing unit, halftone processing unit, ink color separation table unit for performing an ink color separation process, and a creation unit of an ink color separation table.

FIG. 1 is a diagram which best represents characteristics of a first embodiment of the present invention. In FIG. 1, reference numeral 101 denotes a color matching processing unit for matching reproduction characteristics of input image data RGB and color of a printer, 102 denotes an ink color separation processing unit for converting R'G'B' multilevel data from the color matching processing unit 101 into coloring material colors cyan (C'), magenta (M'), yellow (Y'), and black (K') of the printer, and 103 denotes a halftone processing unit for converting C'M'Y'K' multilevel data from the ink color separation processing unit 102 to a gradation number which can be represented by the printer. A reference numeral 105 denotes an ink color separation table unit for providing a table (LUT) to execute an interpolation process in the ink color separation processing unit 102, and 104 denotes an ink color separation table creation unit for creating the LUT of the ink color separation table unit 105.

Figure 14:
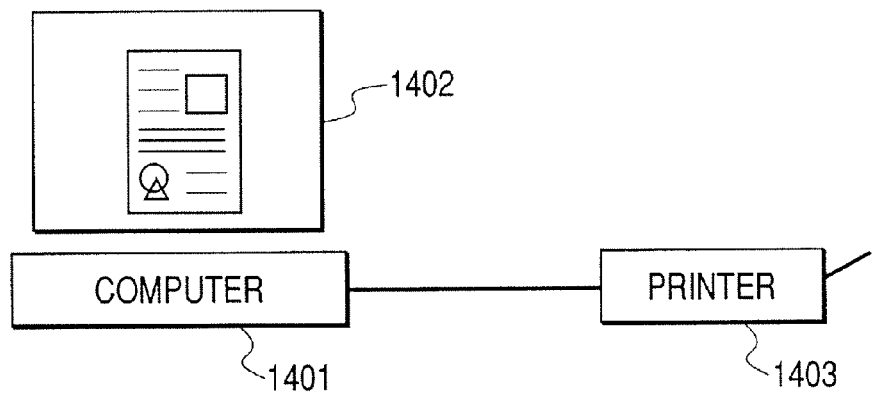
FIG. 14 is a diagram of a system constitution in which the present invention is carried out and shows a connection relationship of a computer, monitor, and printer.

FIG. 14 shows a system constitution which is achieved in the present embodiment. Reference numeral 1401 denotes a computer in which input image data is held, 1402 denotes a monitor for displaying the image data held in the computer 1401, and 1403 denotes a color printer for printing the image data. A flow of data in the system constitution of FIG. 14 will hereinafter be described together with a processing of FIG. 1 which shows an image processing flow. The image data held in the computer 1401 in FIG. 14 is sent to the printer 1403 via a cable or a network (not shown) so that the data is printed by the printer 1403. In the printer 1403, the color matching processing unit 101 of FIG. 1 performs a color matching process in accordance with color reproduction properties of the monitor 1402 used by a user. The R'G'B' data subjected to the color matching process is separated into ink colors by an interpolation process based on the already generated data of the ink color separation table unit 105 by the ink color separation processing unit 102. The C'M'Y'K' multilevel data subjected to the ink color separation is converted to a gradation number of the printer which can be reproduced by the halftone processing unit 103 and printed by the printer 1403. Here, the data stored in the ink color separation table unit 105 is generated beforehand by the ink color separation table creation unit 104, and a generation method will be described hereinafter in detail with reference to FIGS. 2A to 2C and the subsequent drawings.

Figure 2A:
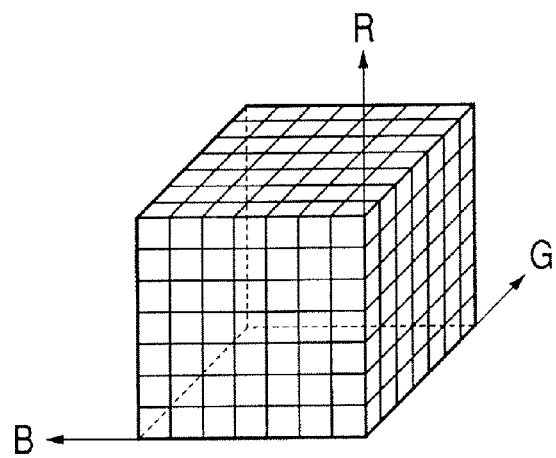
FIG. 2A is a diagram showing the table of an ink color separation table unit 105 of FIG. 1, in which data of CMYK is stored for each grid point.

FIG. 2A is an explanatory view of the ink color separation table unit 105. As shown in FIG. 2A, for input data R'G'B', data of grid points distributed in a grid form in a cube in an RGB three-dimensional space is stored as a table. In the ink color separation processing unit 102, when the inputted R'G'B' data does not exist on the grid of the ink color separation table unit 105, grid point data in the vicinity is used to perform the interpolation process. An interpolation method includes various methods such as tetrahedron interpolation and cube interpolation, but an ink separation table creation method of the present invention, and image processing do not depend on a specific interpolation method, and therefore any interpolation method may also be used.

Figure 2B:
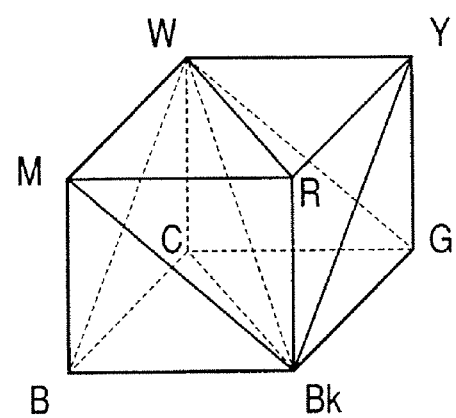
FIG. 2B is a diagram showing a method of dividing an input cubic of FIG. 2A into six tetrahedrons.

FIG. 2B is an explanatory view of a concrete table creation method of FIG. 3 and the subsequent drawings. Eight peaks of the cube shown in FIG. 2A are set to W, C, M, Y, R, G, B, Bk, and a line connecting W-C, M, YR, G, B, -Bk, and W-Bk is shown by a solid or dotted line. Here, assuming that the bit number of the input data of the ink color separation processing unit 102 is eight, coordinates of peaks W, C, M, Y, R, G, B, Bk are as follows:

W=(255, 255, 255), indicating white, that is, the color of print paper;
   C=(0, 255, 255), indicating cyan primary color;
   M=(255, 0, 255), indicating magenta primary color;
   Y=(255, 255, 0), indicating yellow primary color;
   R=(255, 0, 0), indicating red primary color;
   G=(0, 255, 0), indicating green primary color;
   B=(0, 0, 255), indicating blue primary color; and
   Bk=(0, 0, 0), indicating black, that is, a darkest point of the printer.

Figure 2C:
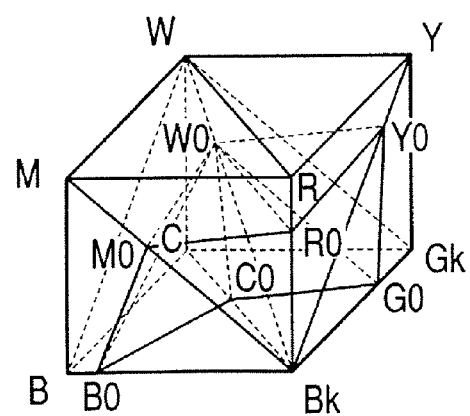
FIG. 2C is an explanatory view of a gray component replacement point and shows that the gray component

The ink color separation table creation method of the present embodiment comprises: creating an ink separation table of lines connecting W-C, M, Y, R, G, B-Bk, and W-Bk; and subsequently creating all table data of ink colors corresponding to internal grid points by an internal interpolation process. Moreover, FIG. 2C is an explanatory view of a gray component replacement point, and shows that the gray component replacement point can three-dimensionally/continuously be controlled by seven points of seven lines W-Bk, C, M, Y, R, G, B-Bk.

FIG. 3 is a flowchart showing the ink color separation table creation unit 104. In FIG. 3, step S3-0 is a start step in which creation of a table to be downloaded into the ink color separation table unit 105 is started. Step S3-1 is a setting step of gray component (K ink) replacement point W0 in a W-Bk line. A gray component replacement UI 1402-1 in FIG. 14 is used to determine the gray component replacement point in a gray line to black from white in consideration of characteristics of the printer 1403. Step S3-2 is a creation step of the ink color separation table of the W-Bk line based on the setting step S3-1 of the gray component (K ink) replacement point W0 in the W-Bk line, and the ink color separation table of the gray line to black from white is created. Step S3-3 is a creation. step of the ink color separation table of W-C, M, Y, R, G, B lines, and the ink color separation table of white-cyan, W-magenta, W-yellow, W-red, W-green, W-blue lines is created. Step S3-4 is a setting step of gray component (K ink) replacement points C0, M0, Y0, R0, G0, B0 in the C, M, Y, R, G, B-Bk lines. The gray component replacement UI 1402-1 in FIG. 14 is used to set gray component (K ink) replacement starting points in cyan-black, magenta-black, yellow-black, red-black, green-black, blue-black lines. Step S3-5 is a creation step of the ink color separation table of the C, M, Y, R, G, B-Bk lines, and the ink color separation table of cyan-black, magenta-black, yellow-black, red-black, green-black, blue-black lines is created. Step S3-5' is a creation step of the ink color separation table for each of yellow-red, yellow-green, cyan-green, cyan-blue, magenta-blue, magenta-red lines. Step S3-6 is a step of executing an internal interpolation process, and the ink color separation table corresponding to each grid line of an internal space of each line generated in the steps S3-1 to S3-5 is created. Step S3-7 is a step of executing a smoothing process of the color separation table created in the step S3-6.

In the step S3-5 of the table creation, the table is created in which an optimum under color removal (UCR) amount and gray component replacement (BG) amount are set for each hue. Thereby, it is possible to set the table in which a color reproduction range of the printer is maximized and an influence of granularity by a gray component is suppressed as much as possible.

Figure 4A:
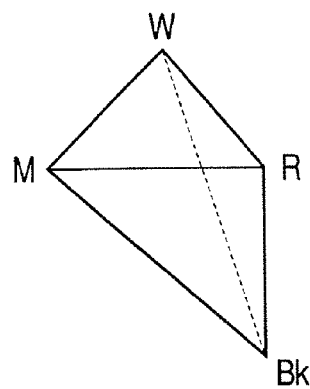
FIG. 4A shows a tetrahedron constituted of peaks W, R, M, Bk.
Figure 4D:
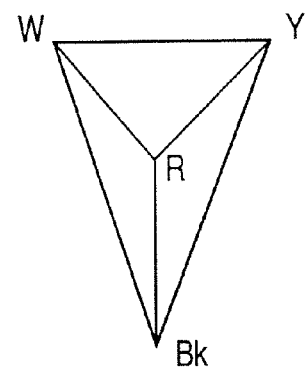
FIG. 4D shows a tetrahedron constituted of peaks W, Y, R, Bk.
Figure 4B:
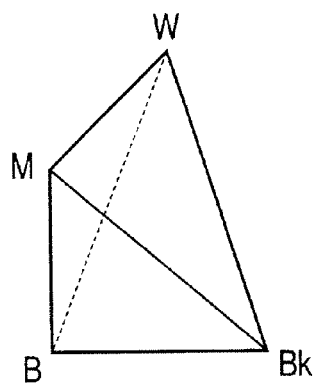
FIG. 4B shows a tetrahedron constituted of peaks W, M, B, Bk.
Figure 4E:
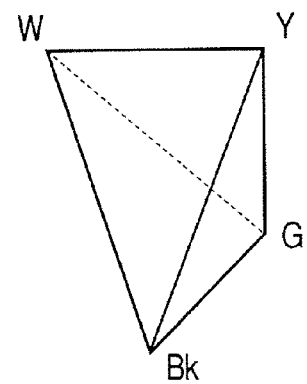
FIG. 4E shows a tetrahedron constituted of peaks W, Y, G, Bk.
Figure 4C:
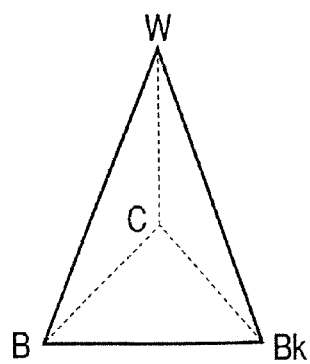
FIG. 4C shows a tetrahedron constituted of peaks W, C, B, Bk.
Figure 4F:
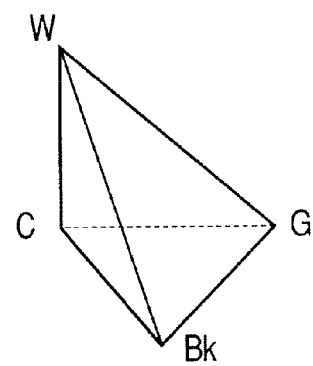
FIG. 4F shows a tetrahedron constituted of peaks W, C, G, Bk.

A content of the step S3-6 of the internal interpolation process will be described hereinafter with reference to FIGS. 4A to 4F and the subsequent drawings. The step S3-4 of the internal interpolation process comprises: dividing one plane into six tetrahedrons constituted of triangles as shown in FIGS. 4A to 4F; and executing the interpolation process for each tetrahedron. FIG. 4A shows a tetrahedron constituted of peaks W, R, M, Bk, FIG. 4B shows a tetrahedron constituted of peaks W, M, B, Bk, FIG. 4C shows a tetrahedron constituted of peaks W, C, B, Bk, FIG. 4D shows a tetrahedron constituted of peaks W, Y, R, Bk, FIG. 4E shows a tetrahedron constituted of peaks W, Y, G, Bk, and FIG. 4F shows a tetrahedron constituted of peaks W, C, G, Bk.

Figure 5:
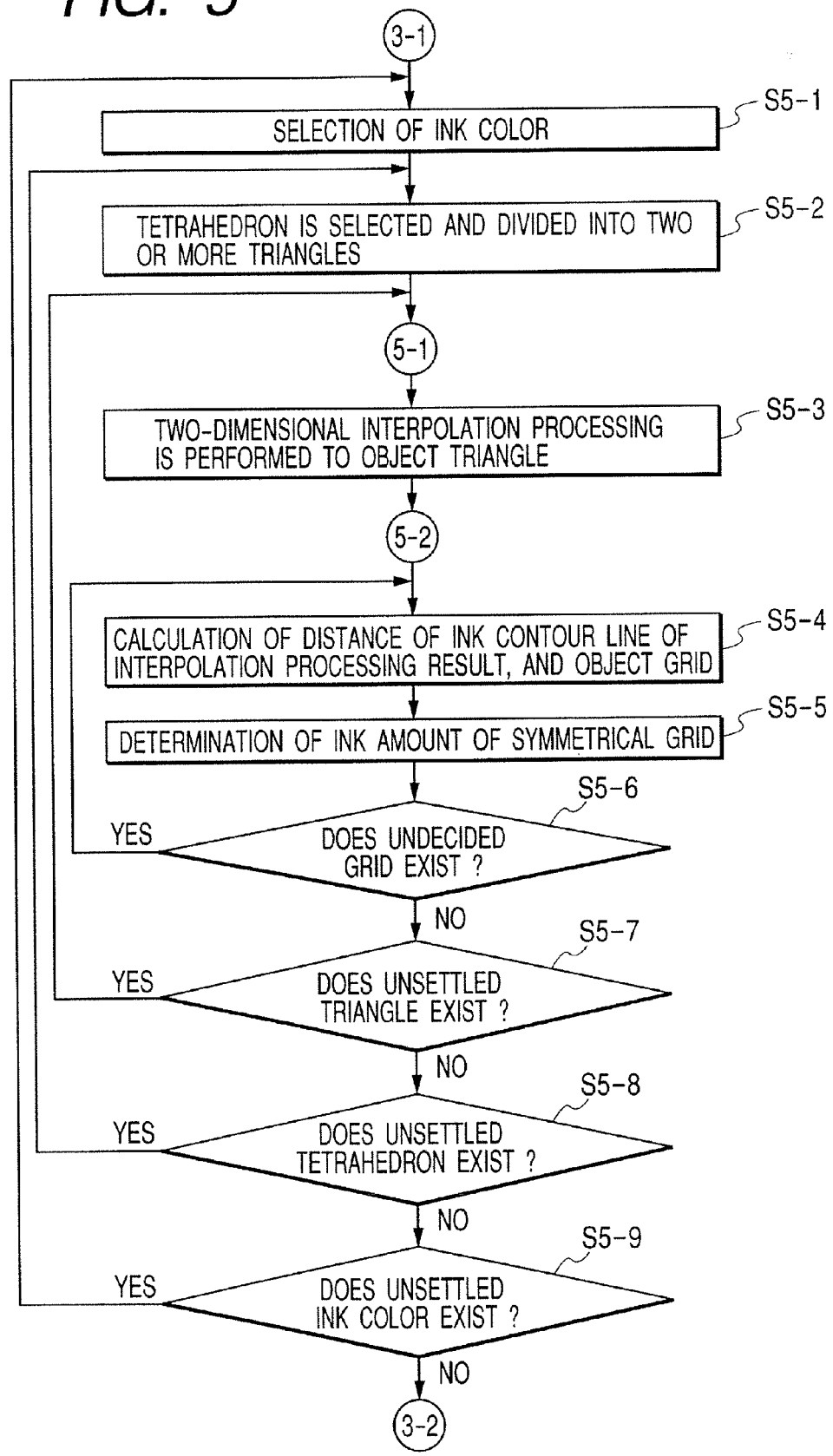
FIG. 5 is a flowchart showing an internal interpolation process step S3-6 of FIG. 3 in detail.

FIG. 5 is a flowchart showing a concrete processing of the internal interpolation process of the step S3-6. In FIG. 5, step S5-1 is a selection step of an ink color, and ink colors of cyan, magenta, yellow, and black are successively selected in order to determine an ink amount for each grid in the following steps. Step S5-2 is a step of selecting the tetrahedron and dividing the tetrahedron into a plurality of triangles. Six tetrahedrons shown in FIGS. 4A to 4F are successively selected, and divided into a plurality of triangles. For example, in FIG. 4A, the division method into the plurality of triangles comprises: first dividing the tetrahedron into four constituting triangles WMR, WMBk, WRBk, MRBk; and subsequently dividing the inside of the tetrahedron WMRBk into a plurality of triangles by a surface extending in parallel to the triangle WRM in accordance with the number of grids. The next step S5-3 is an execution step of a two-dimensional interpolation process with respect to an object triangle. A content of the two-dimensional interpolation process with respect to each triangle will be described in detail with respect to FIG. 6 and the subsequent drawings.

Step S5-4 is a calculation step of a distance between an ink contour line of an interpolation process result and each grid. The distance is calculated between the contour line of FIG. 6 generated by the execution step S5-3 of the two-dimensional interpolation process with respect to each triangle and the grid corresponding to the ink color separation table unit 105. Step S5-5 is a determination step of the ink amount of an object grid. A smallest distance in a result of the calculation step S5-4 of the distance between the ink contour line as the interpolation process result and each grid is determined as the ink amount of the object grid. Step S5-6 is a step of judging whether or not an undecided grid exists. When the undecided grid exists, the step goes to step S5-4, and steps S5-4 and S5-5 are executed with respect to the next grid.

When the ink amounts of all the grids are determined in the triangle set as the object in the step S5-3, the step advances to step S5-7. The step S5-7 is a step of judging whether or not the unsettled triangle exists. It is judged whether or not the processing ends with respect to a plurality of triangles divided in the step S5-2. When the unsettled triangle exists, the step advances to step S5-3, and the process of the steps S5-3 to S5-6 is repeated. When the processing ends with respect to all the triangles of the tetrahedron selected in the step S5-2, the step advances to step S5-8. The step S5-8 is a step of judging whether or not an unsettled tetrahedron exists. When the unsettled tetrahedron exists, the step advances to step S5-2, and the process of the steps S5-2 to S5-7 is repeated. When the processing ends with respect to all the tetrahedrons, the step advances to step S5-9. The step S5-9 is a step of judging whether or not an unsettled ink color exists. When the unsettled ink color exists, the step advances to the step S5-1, and the process of the steps S5-1 to S5-8 is repeated. When the processing ends with respect to all the ink colors, the step returns to S3-2.

Figure 6:
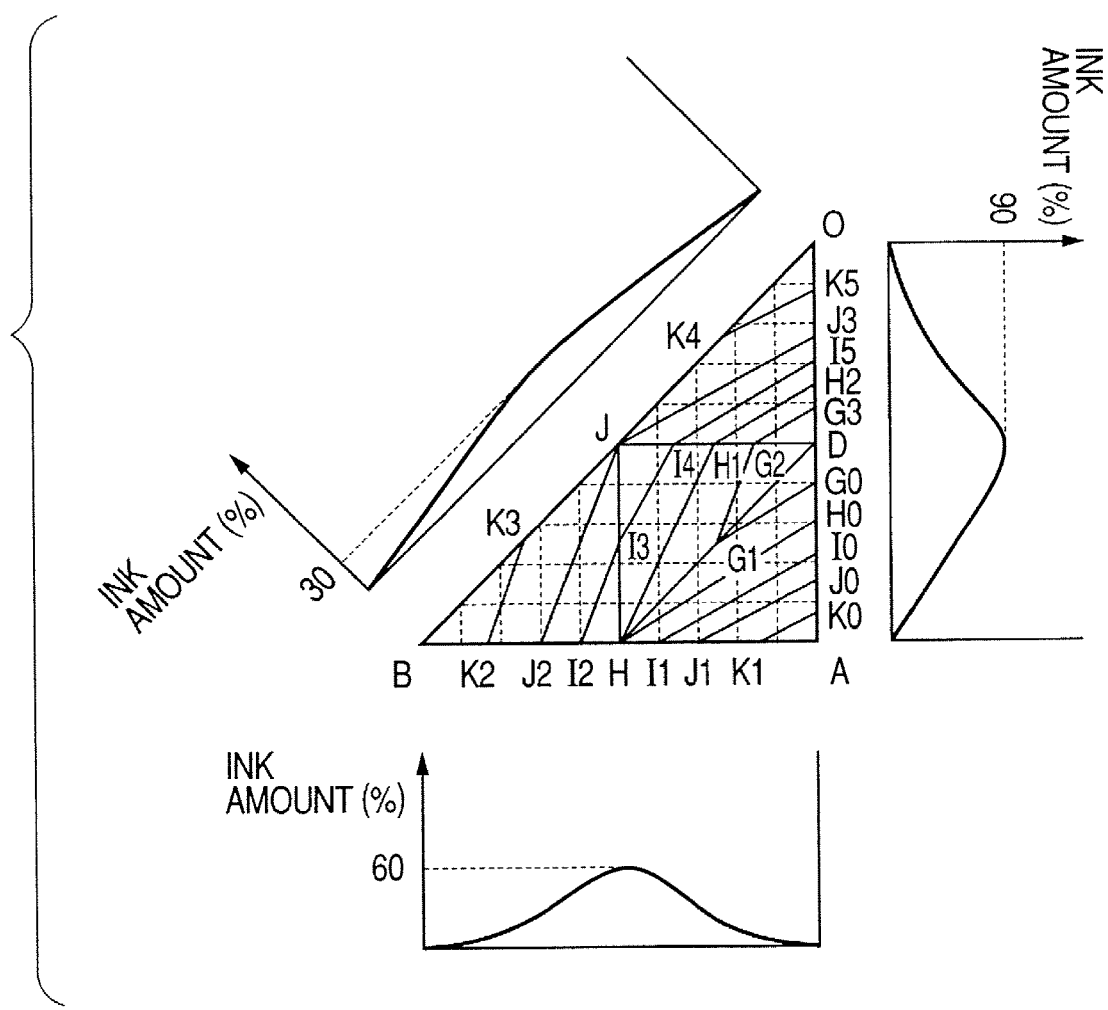
FIG. 6 is a diagram of an ink contour line of an internal interpolation result, in which change curves of ink amounts of three sides of a triangle are shown.

A concrete content of the process in the execution step S5-3 of the two-dimensional interpolation process with respect to the object triangle will next be described with reference to FIG. 6 and the subsequent drawings. FIG. 6 is a diagram of an ink contour line of an internal interpolation result, in which curves of the ink amounts of three sides of a certain triangle are shown. In FIG. 6, the change of the ink amount in a side OA is shown in a graph on the right side, and a peak ink amount is 90%. The change of the ink amount in a side OB is shown in a left upper graph, and the peak ink amount is 30%. Moreover, the change of the ink amount in a side AB is shown in a graph under the side AB, and the peak ink amount is 60%.

Figure 7:
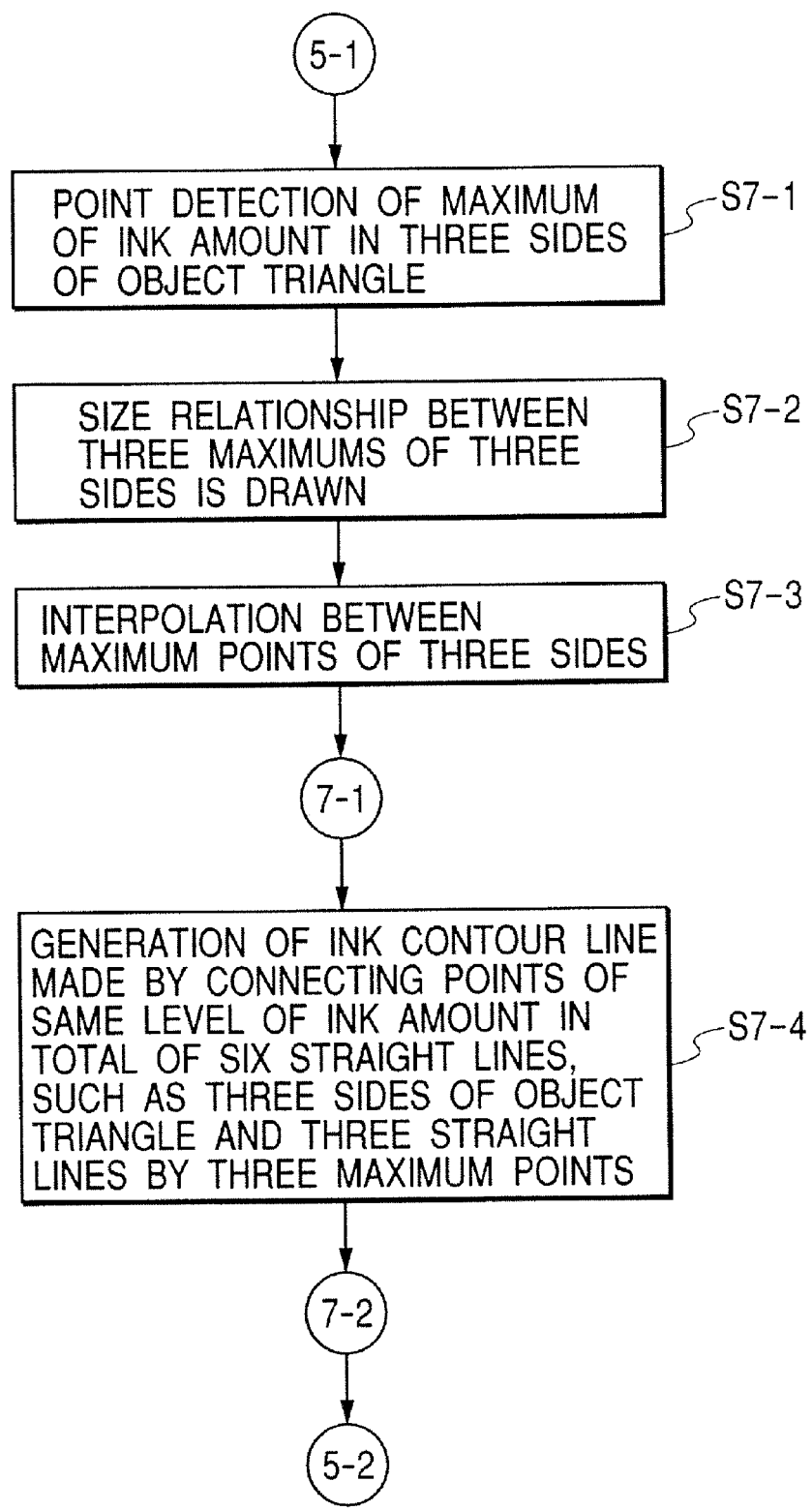
FIG. 7 is a flowchart of a two-dimensional interpolation process execution step S5-3 with respect to an object triangle of FIG. 5.
Figure 8:
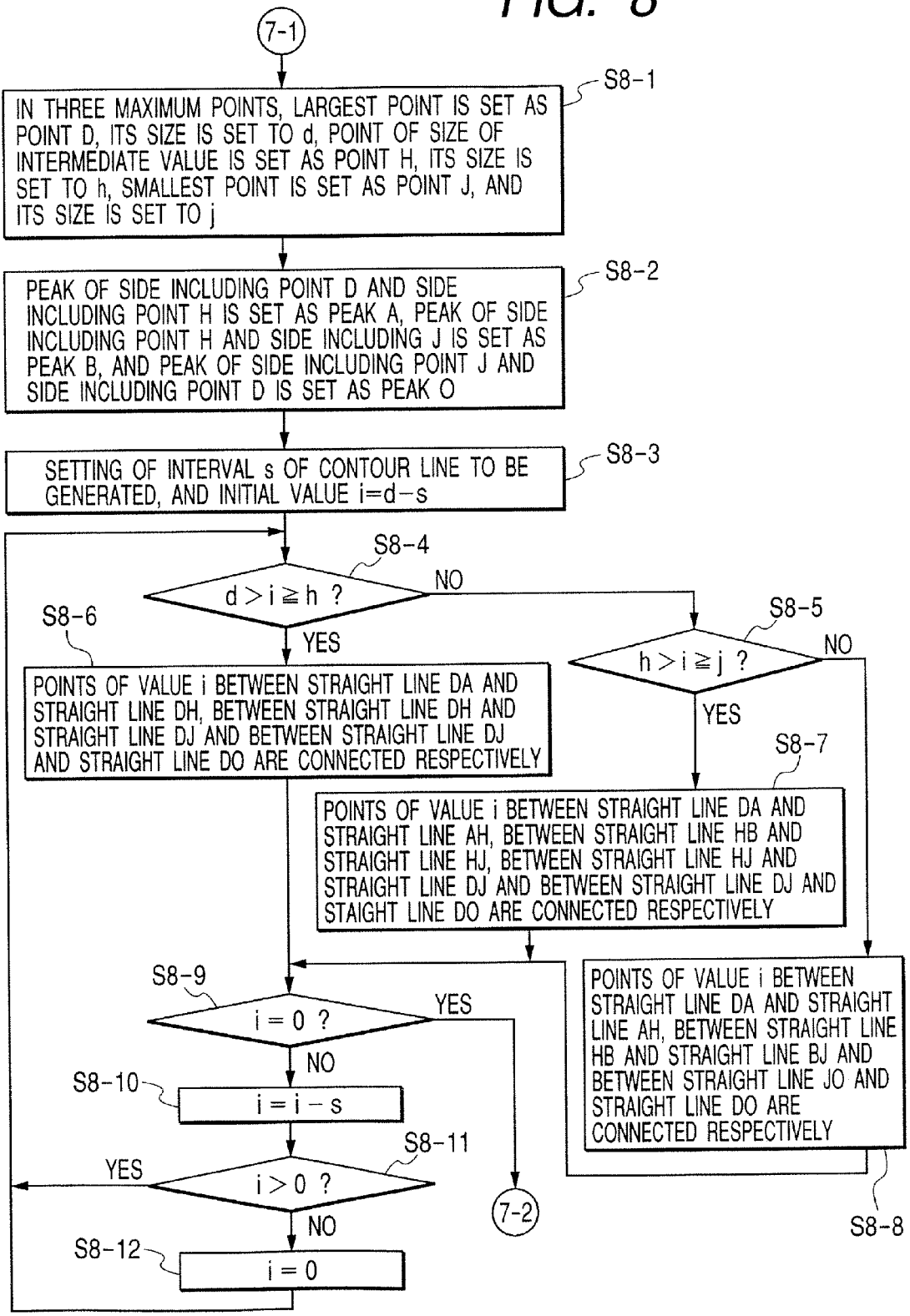
FIG. 8 is a flowchart of an ink contour line generation step S7-4 of connecting points of the same level of the ink amount in six straight lines in total, including three sides of the object triangle and three straight lines by three maximum points.

FIGS. 7 and 8 are flowcharts showing the execution of the two-dimensional interpolation process with respect to the object triangle in detail. FIGS. 7 and 8 will be described hereinafter in the example of FIG. 6. In FIG. 7, step S7-1 is a step of detecting the point of the maximum of the ink amounts in three sides of the object triangle. Step S7-2 is a step of drawing a size relationship among three maximums of three sides. Step S7-3 is a step of interpolating among the maximum points of three sides. The three maximums in three sides are connected via straight lines, and the interpolation is performed from opposite end values among the maximums. Step S7-4 is a step of connecting points of the same level of the ink amount in six straight lines in total including three sides of the object triangle and three straight lines by three maximum points and generating the ink contour line.

The step S7-4 will next be described in detail with reference to FIG. 8. In FIG. 8, in step S8-1, based on results of the stops S7-1 and S7-2, in three maximum points, a largest point is set to point D, the size of the point is set to d, a point of a size of an intermediate value is set to point H, the size is set to h, a smallest point is set to point J, and the size is set to j. In the example of FIG. 6, d=90, h=60, and j=30. Step S8-2 is a step of setting a peak of sides including points D and H to A, setting the peak of the sides including points H and J to B, and setting the peak of the sides including points J and D to O. Step S8-3 is a step of setting an interval s of the contour line to be generated, and an initial value i=d−s.

Thereafter, the contour line is successively generated until the ink amount turns to zero in a loop of steps S8-4 to S8-12. Step S8-4 is a step of judging whether or not d>i≧h is established. If yes, in step S8-6 the points of value i are connected between straight lines DA and DH, between straight lines DH and DJ, and between straight lines DJ and DO, respectively. Since the interval of the contour line is s=15 in the example of FIG. 6, the contour line of i=75 is generated as G0-G1-G2-G3, and the contour line of i=60 is generated as H0-H-H1-H2. Moreover, if no in the step S8-4, the step advances to step S8-5. The step S8-5 is a step of judging whether or not h>i≧j is established. If yes, in step S8-7 the points of value i are connected between the straight lines DA and AH, between HB and HJ, between HJ and DJ, and between DJ and DO, respectively. In the example of FIG. 6, the contour line of i=45 is generated as I0-I1, I2-I3-I4-I5, and the contour line of i=30 is generated as J0-J1, J2-J-J3. If no in the step S8-5, the step advances to step S8-8. In the step S8-8 the points of value i are connected between the straight lines DA and AH, between HB and BJ, and between JD and DO. In the example of FIG. 6, the contour line of i=15 is generated as K0-K1, K2-K3, K4-K5. Step S8-9 is a step of judging whether or not i=0 is established. If yes, the generation of the contour lines of all the object triangles ends, and the step returns to S7-2. If no, the step advances to step S8-10. In step S8-10, i=i-s is calculated. In step S8-11, it is judged whether or not i>0. If yes, the step advances to step S8-4. If no, in step S8-12, i=0 is calculated, and the step advances to step S8-4. As described above, the loop of steps S8-4 to S8-12 is repeatedly executed, until the value i of the contour line turns to zero.

In FIG. 6, for ease of understanding the description, the setting of s=15 is illustrated. However, to more accurately obtain the value of the grid, needless to say, s=1 is set, and the contour line should be generated for each step.

Figure 9:
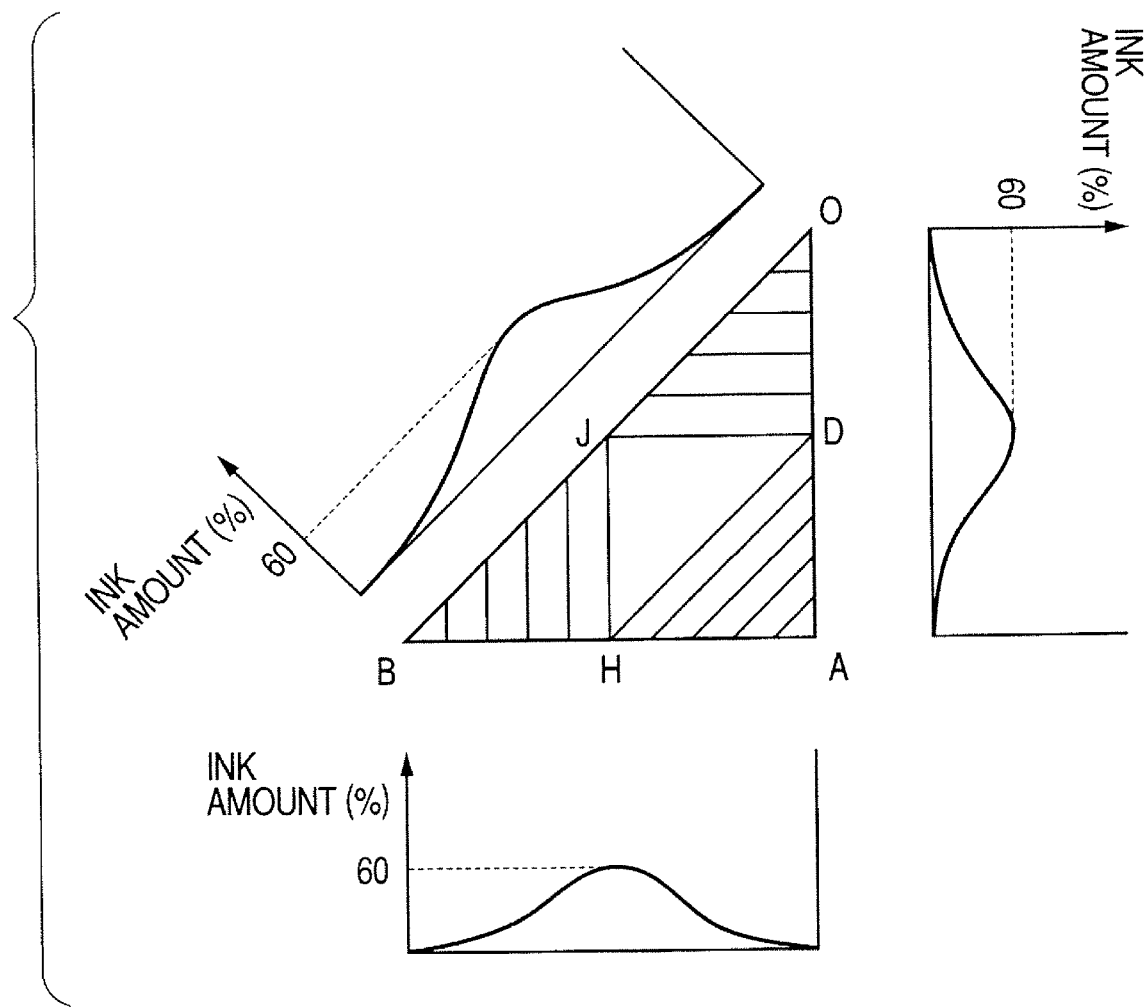
FIG. 9 is an explanatory view of the contour line generation of the object triangle in which three sides have the same maximum.
Figure 10:
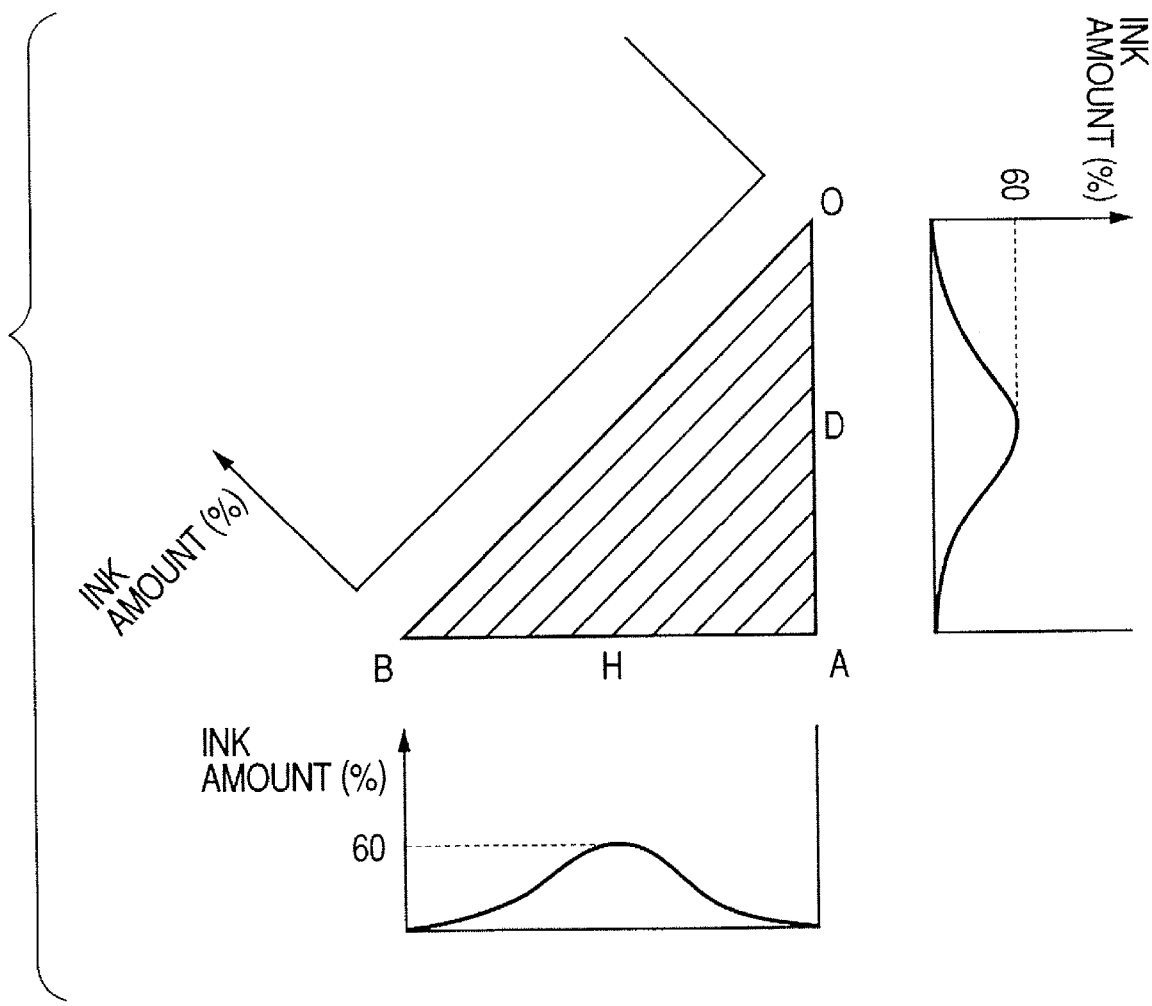
FIG. 10 is an explanatory view of the contour line generation of the object triangle in which two sides have the same maximum and one side has a maximum of zero.
Figure 11:
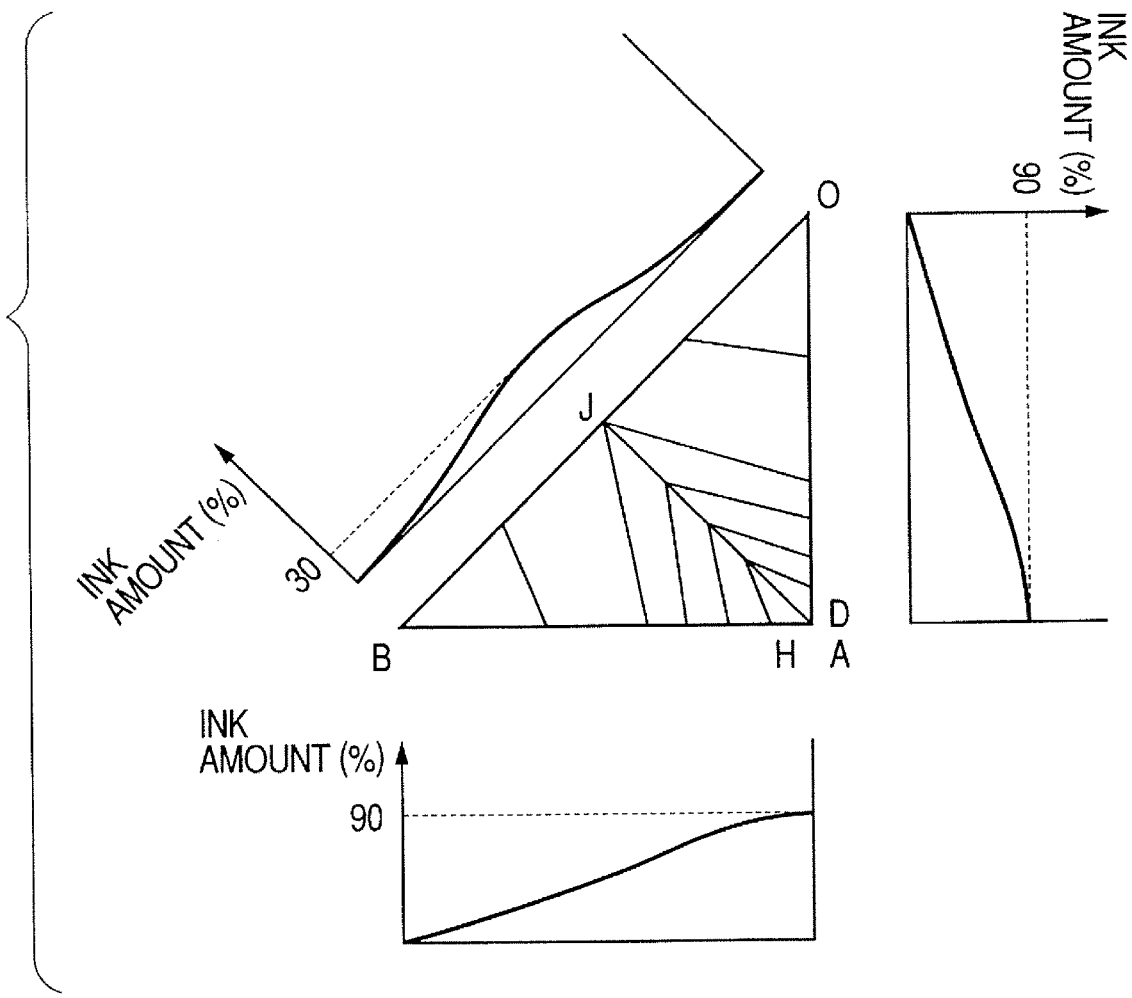
FIG. 11 is an explanatory view of the contour line generation of the object triangle whose two sides have the same maximum and whose values are overlapped in one peak.

For the ink curves of three sides different from those of the example of FIG. 6, an operation will be described hereinafter with respect to examples of FIGS. 9, 10, 11. FIG. 9 shows an example in which the three sides have the same maximum. Although this example is not clearly shown in FIG. 8, only the contour line generation step S8-8 is executed, and the contour line is generated as shown in FIG. 9. FIG. 10 shows an example in which the ink amount of one side is all zero and the other two sides have the same maximum. In this case, the points of the value i are connected between the straight lines DA and AH and between HB and DO as shown in FIG. 10. FIG. 11 shows an example in which two sides have the same maximum and the value is overlapped with point A. In this case, in the step S8-6 in FIG. 8, since D, A, H are the same point, the contour line is not generated. In the step S8-7, the connection between the straight lines DA and AH does not exist, because D, A, H are the same point. The connection between the straight lines HJ and DJ is not executed, because D, H are the same point. The points of the value i only between the straight lines HB and HJ, and DJ and DO are connected, respectively. Moreover, in the step S8-8, the connection between the straight lines DA and AH does not exist, because D, A, H are the same point. The points of the value i only between the straight lines HB and BJ, and JO and DO are connected, respectively, and the contour line is obtained as shown in FIG. 11.

Figure 12:
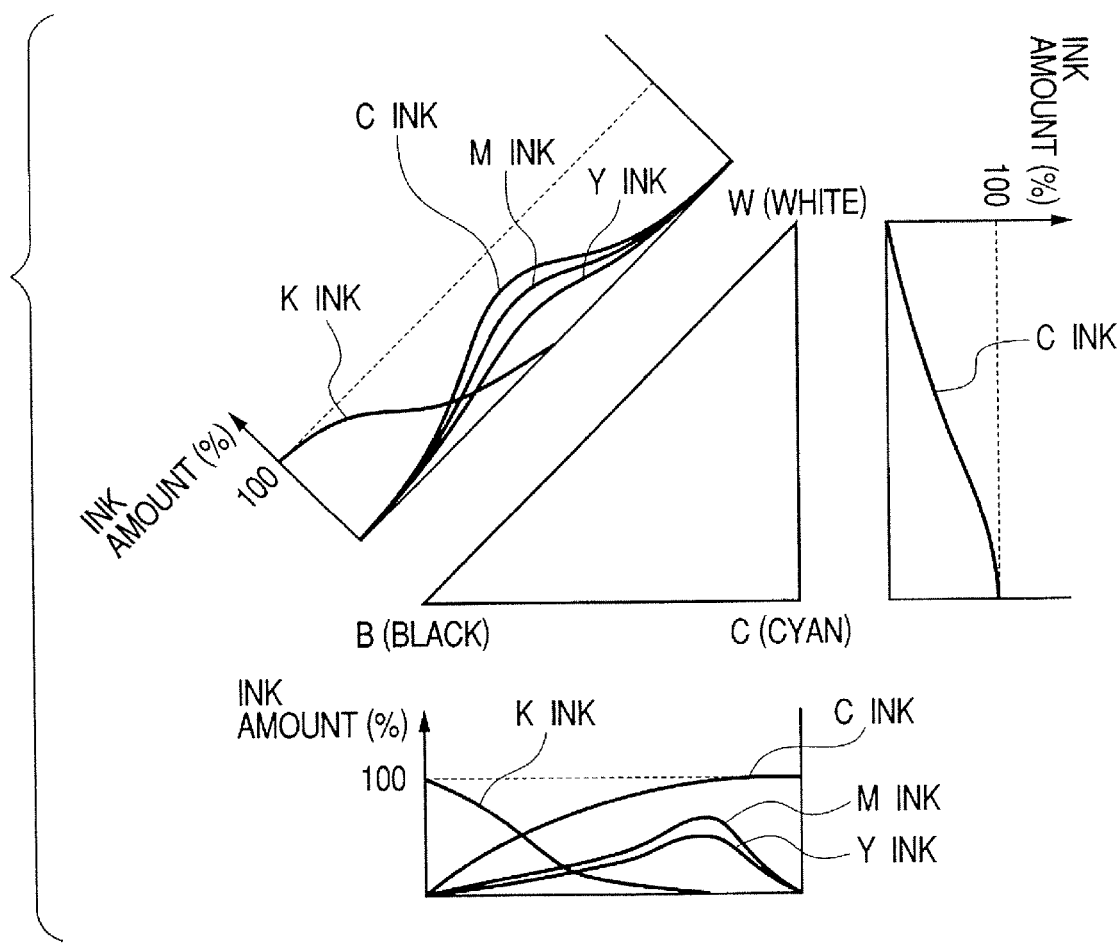
FIG. 12 is an explanatory view of an interpolation example in the triangle by peaks W-C-Bk in FIG. 2B and shows a curve example of the ink amounts of C, M, Y, K in each side.
Figure 13A:
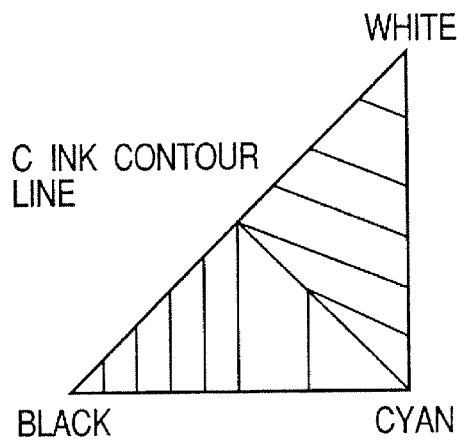
FIG. 13A is a diagram showing the contour line of C ink in the object triangle of FIG. 12.
Figure 13B:
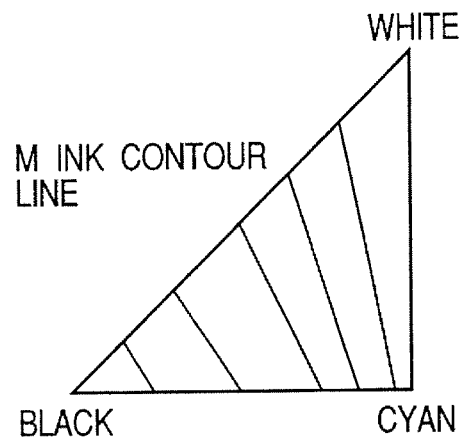
FIG. 13B is a diagram showing the contour line of M ink in the object triangle of FIG. 12.
Figure 13C:
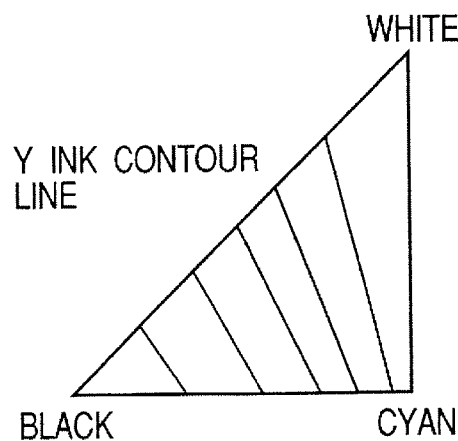
FIG. 13C is a diagram showing the contour line of Y ink in the object triangle of FIG. 12.
Figure 13D:
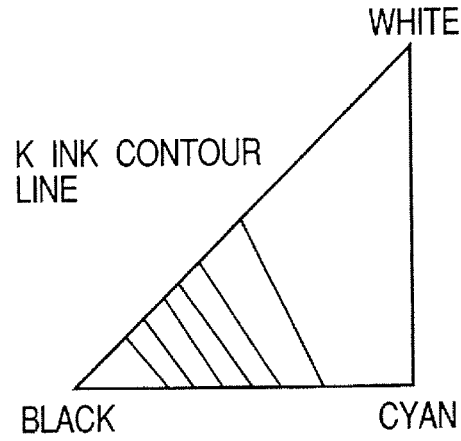
FIG. 13D is a diagram showing the contour line of K ink in the object triangle of FIG. 12.

FIG. 12 is an explanatory view of an interpolation example in the triangle by peaks W-C-Bk in FIG. 2B and shows a curve example of the ink color table of C, M, Y, K in each side. Moreover, FIGS. 13A to 13D show the contour lines of each ink color of FIG. 12, and FIG. 13A shows the contour line of C ink. This corresponds to the example of FIG. 11. FIG. 13B shows the contour line of M ink, and this corresponds to the example of FIG. 10. FIG. 13C shows the contour line of Y ink and this also corresponds to the example of FIG. 10. FIG. 13D shows the contour line of K ink and this corresponds to the example of FIG. 10. However, since the K ink is inserted halfway, the area of the ink amount of zero broadly exists, and the K ink contour line is generated halfway.

Figure 17:
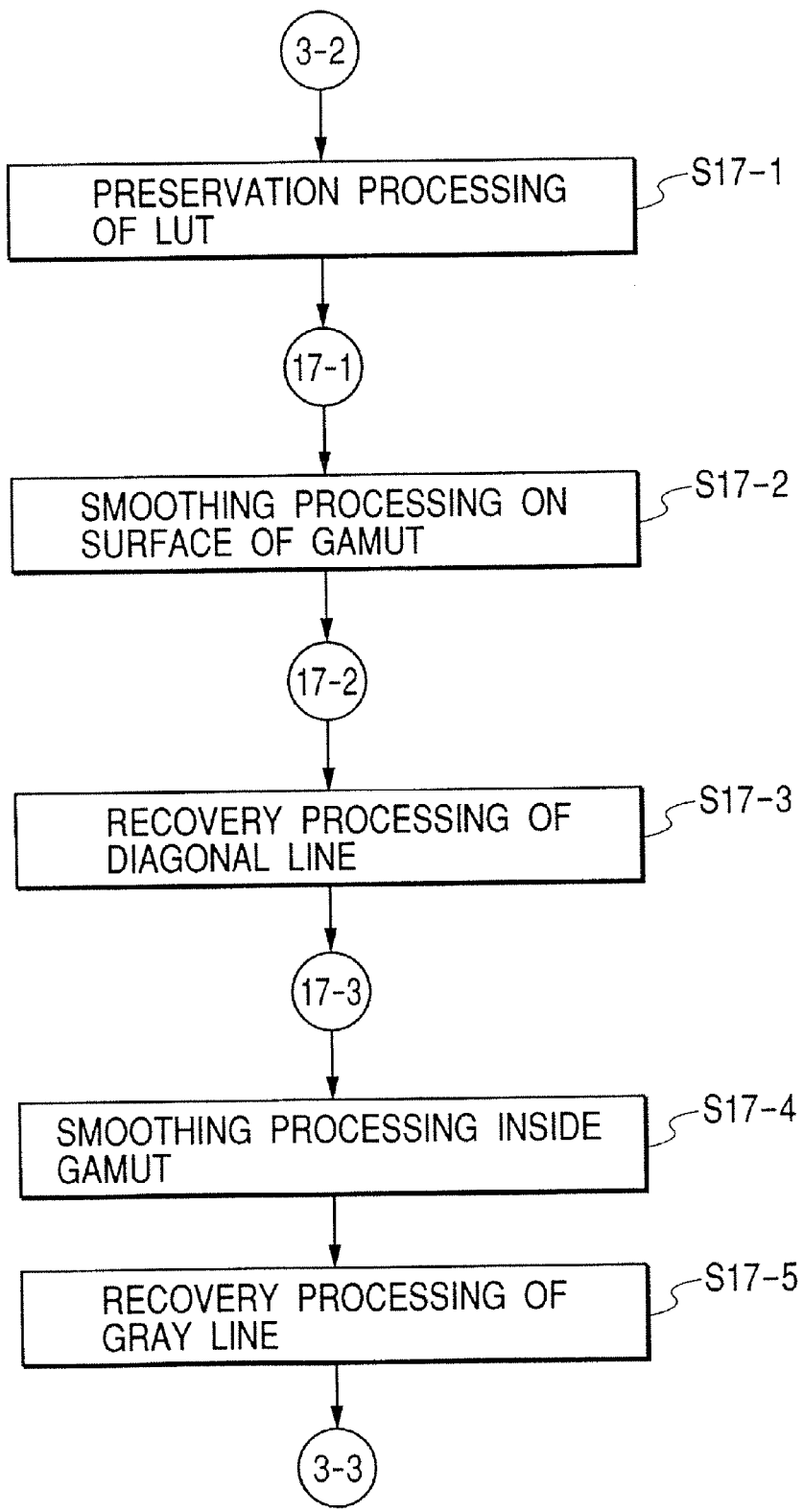
FIG. 17 is a flowchart of a detailed content of a smoothing process step S3-7.

The content of the step S3-7 of the smoothing process will be described hereinafter in detail with reference to FIG. 17 and the subsequent drawings. In FIG. 17, step S17-1 is a preservation process step of LUT. In the process, LUT is stored so that an original value is referred to in a recovery process step S17-3 of a diagonal line or a recovery process step S17-5 of a gray line. Step S17-2 is a smoothing process step of Gamut surface. The surface of Gamut is smoothed by a two-dimensional filtering process. The step S17-3 is a recovery process step of the diagonal line. This is a process of returning the value of the diagonal line having deviated from the original value by the smoothing process step S17-2 in the Gamut surface back to the original value. While the smoothness by the smoothing process is kept even with respect to the value around the diagonal line, the recovery process is executed. Step S17-4 is a smoothing process step inside Gamut, and three-dimensional smoothing is executed by the three-dimensional filtering process. Step S17-5 is the recovery process step of the gray line, and the value of the gray line having deviated from the original value is returned to the original value by the smoothing process inside Gamut in the step S17-4.

Figure 18:
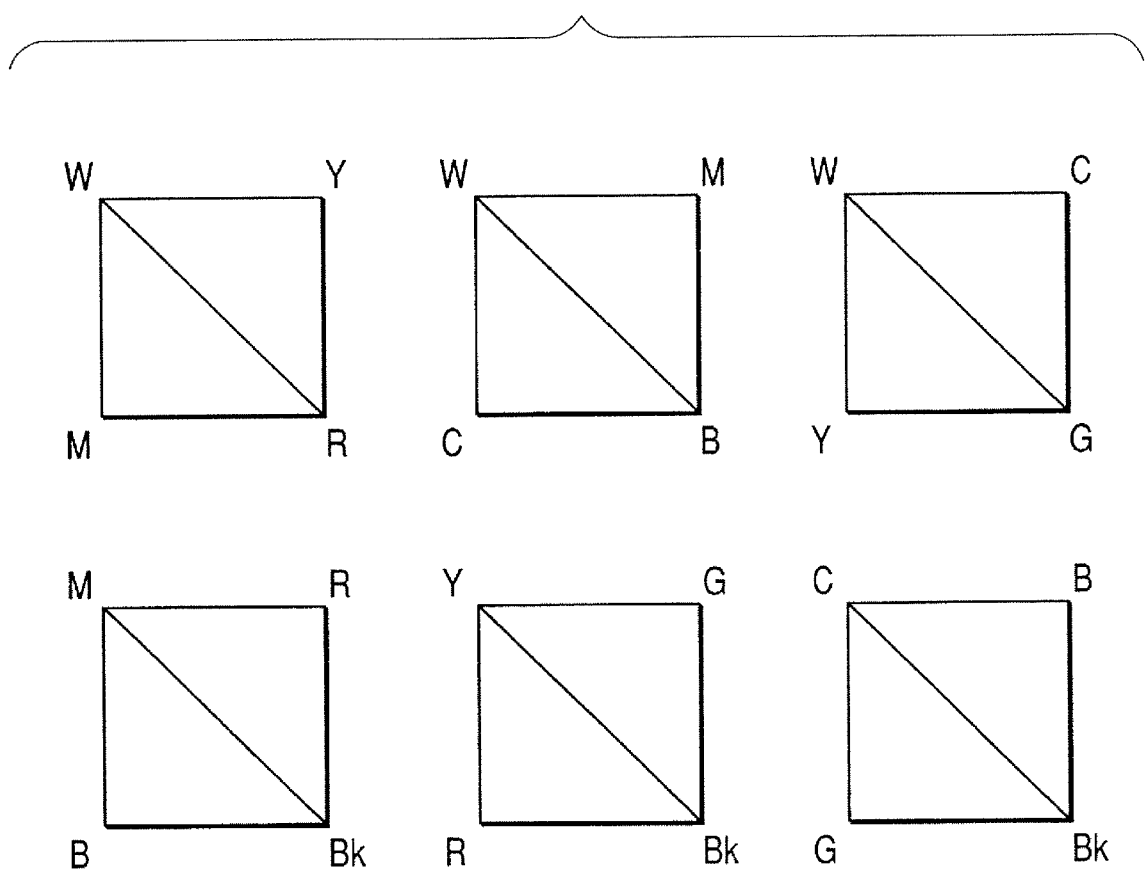
FIG. 18 is an explanatory view of a Gamut surface.

FIG. 18 is an explanatory view of the surface of Gamut. In the step S17-2 of the smoothing process of the Gamut surface, six quadrangles shown in FIG. 18 are subjected to the two-dimensional smoothing process. Diagonal lines W-R, W-B, W-G, M-Bk, Y-Bk, C-Bk in FIG. 18 are recovered by the recovery process step S17-3 of the diagonal line.

Figure 19:
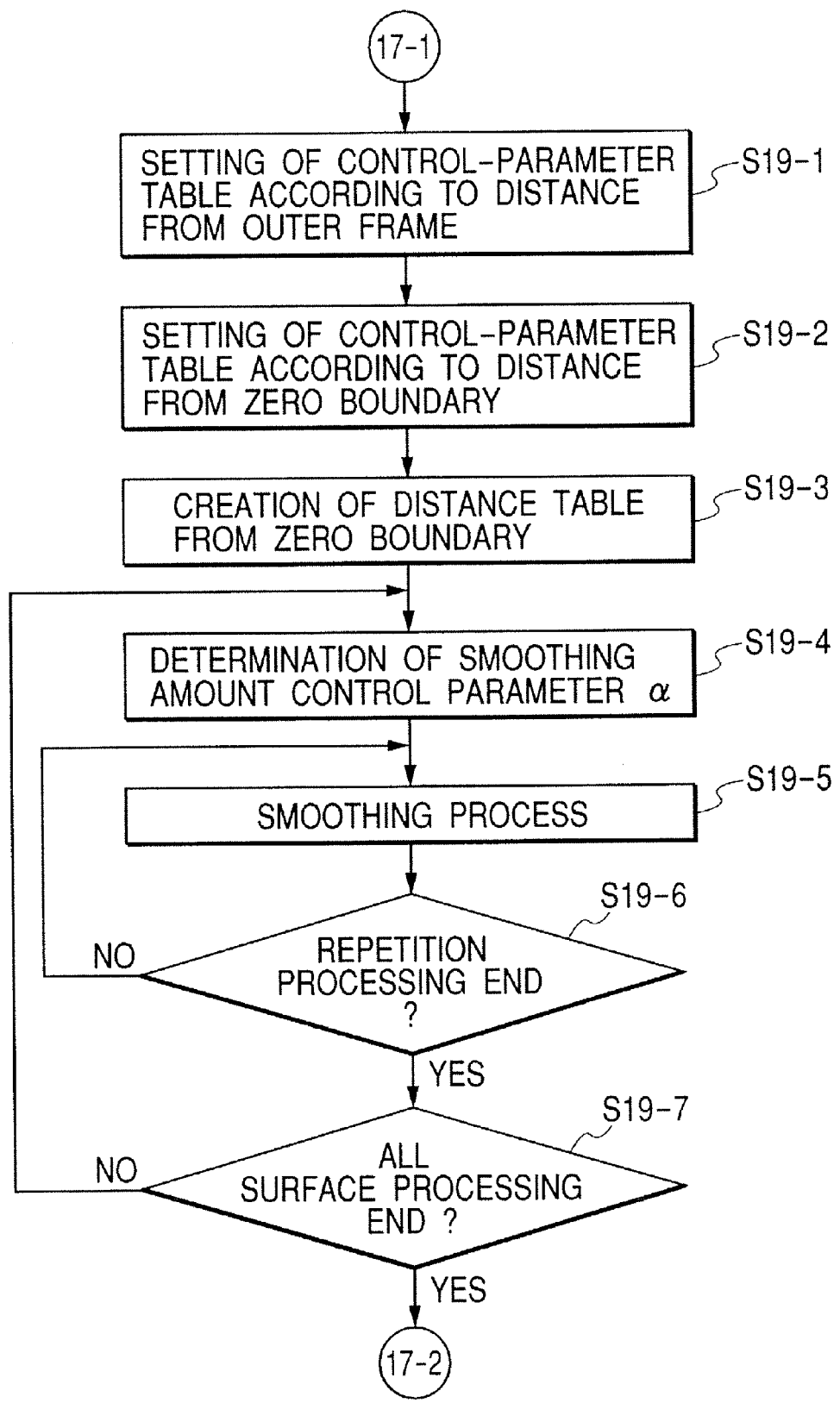
FIG. 19 is a flowchart of a detailed content of a smoothing process step S17-2 of the Gamut surface.

FIG. 19 is a flowchart of a detailed content of the smoothing process step S17-2 of the Gamut surface. In FIG. 19, step S19-1 is a setting step of a control parameter table in accordance with a distance from an outer frame, and the parameter table for controlling a smoothing amount in accordance with the distance from an outermost grid point of a smoothing object quadrangle (grid interval) is set. For example, when the color separation table is constituted of 9×9×9 grids, the maximum of the distance from the outer frame is 5. Therefore, when the distance from the outer frame is m, a control parameter table FrameDist [m] in accordance with the distance from the outer frame is set to:

FrameDist [m]={0.00, 0.25, 0.50, 0.75, 1.00}. In the FrameDist [m] table, the smoothing amount is controlled by a parameter in the grid point whose distance from the outer frame increases from the left to the right. When the parameter has a value of 0.00, the smoothing process does not work. When the value is 1.00, the effect degree of the smoothing amount is maximized. As in the above-described example, the value of the parameter for controlling the smoothing amount is increased in a stepwise manner in accordance with the distance from the outer frame. Thereby, with an increase of the distance from the outer frame whose value is not to be changed, it is possible to increase the smoothing amount in the stepwise manner.

Step S19-2 is a setting step of the control parameter table in accordance with the distance from the zero boundary (gray component replacement or dark ink replacement start), and the parameter table for controlling the smoothing amount in accordance with the distance from the zero boundary is set. For example, when the color separation table is constituted of 9×9×9 grids, the maximum of the distance from the zero boundary is 8. Therefore, assuming that the distance from the zero boundary is n, a control parameter table ZeroDist [n] in accordance with the distance from the zero boundary is set to:

ZeroDist [n]={0.00, 0.25, 0.50, 0.75, 1.00, 1.00, 1.00, 1.00}. In the ZeroDist [n] table, the smoothing amount is controlled by the parameter in the grid point whose distance from the zero boundary increases from the left to the right. When the parameter has a value of 0.00, the smoothing process does not work. When the value is 1.00, the effect degree of the smoothing amount is maximized. As in the above-described example, the value of the parameter for controlling the smoothing amount is increased in the stepwise manner in accordance with the distance from the zero boundary. Thereby, in the vicinity of the zero boundary where the value is not to be changed if possible, the effect degree of the smoothing is reduced. When the distance increases, the smoothing amount can be increased.

Step S19-3 is a creation step of the distance table from the zero boundary, and a table in which the value (gray component, dark ink amount) indicates a distance from a grid point of zero (grid interval) is created. For example, when the quadrangles of the Gamut surface indicate values shown in FIG. 20, the distance table from the zero boundary indicates values shown in FIG. 21. As apparent from FIGS. 20, 21, when the color separation table value is zero, the value of the distance table from the zero boundary is zero, and the value of the distance table of the grid point having the color separation table value contacting zero from the zero boundary is one. With the increase of the distance from the zero boundary, the value of the distance table from the zero boundary successively increases.

Step S19-4 is a determination step of a smoothing amount control parameter α, and the parameter α for controlling the smoothing amount of an area as an object is determined. In the present embodiment, two matrixes each of 3×3 shown in FIGS. 22, 23 are used to execute the smoothing process of the Gamut surface. FIG. 22 shows the matrix which defines basic frequency characteristics of the smoothing, and FIG. 23 shows the matrix for controlling the smoothing effect degree. Assuming that a value of a noted grid point is $X(i,j)$, and the value of the noted grid point after the smoothing is $X'(i,j)$, $X'(i,j)$ is represented as follows.

$$X'(i,j) = \{\alpha \cdot a1 \cdot X(i-1,j-1) + \alpha \cdot a2 \cdot X(i-1,j) + \alpha \cdot a3 \cdot X(i-1,j+1) + \alpha \cdot a4 \cdot X(i,j-1) + \beta \cdot a5 \cdot X(i,j) + \alpha \cdot a6 \cdot X(i,j+1) + \alpha \cdot a7 \cdot X(i+1,j-1) + \alpha \cdot a8 \cdot X(i+1,j) + \alpha \cdot a9 \cdot X(i+1,j+1)\}/\text{sum1} \quad (1),$$

wherein for β, sum 1, $\beta = 2 - \alpha$, and $0 \leq \alpha \leq 1$.

$$\text{sum }1 = \alpha \cdot a1 + \alpha \cdot a2 + \alpha \cdot a3 + \alpha \cdot a4 + \beta \cdot a5 + \alpha \cdot a6 + \alpha \cdot a7 + \alpha \cdot a8 + \alpha \cdot a9.$$

Furthermore, assuming that the distance from the outer frame in the noted grid point (i,j) is $FD(i,j)$, and the value of the distance table from the zero boundary created in the step S19-3 is $ZD(i,j)$, the smoothing amount control parameter α is represented by:

$\alpha = \text{Min}[\text{FrameDist}[FD(i,j)], \text{ZeroDist}[ZD(i,j)]]$, wherein Min[A,B] indicates a small value of A, B.

Step S19-5 is a smoothing process step. Assuming that the value of the noted grid point is $X(i,j)$, the smoothing process is executed based on the above equation (1). In the smoothing, without performing the smoothing of the outer frame of the quadrangle as the smoothing object (including lines to the secondary color from white and to the primary color from black) or the smoothing of the grid point up to the gray component, dark ink replacement point, the smoothing of another Gamut surface is possible.

According to the above-described smoothing process, the distortion of the color separation table caused by dividing the color space into six tetrahedrons and subjecting each area to the interpolation process or the distortion generated during the internal interpolation can be removed. As a result, the pseudo contour of the reproduced image can be prevented from being generated.

Step S19-6 is a repetition processing end step, and is a step of judging whether or not the set number of smoothing processes has ended. If no, the step advances to step S19-5. If yes, the step advances to step S19-7.

Step S19-7 is a processing end step of the whole surface, and is a step of judging whether or not all the smoothing processes of six Gamut surfaces shown in FIG. 18 have ended. If no, the step advances to step S19-4. If yes, the step advances to the recovery process step S17-3 of the diagonal line.

Figure 24:
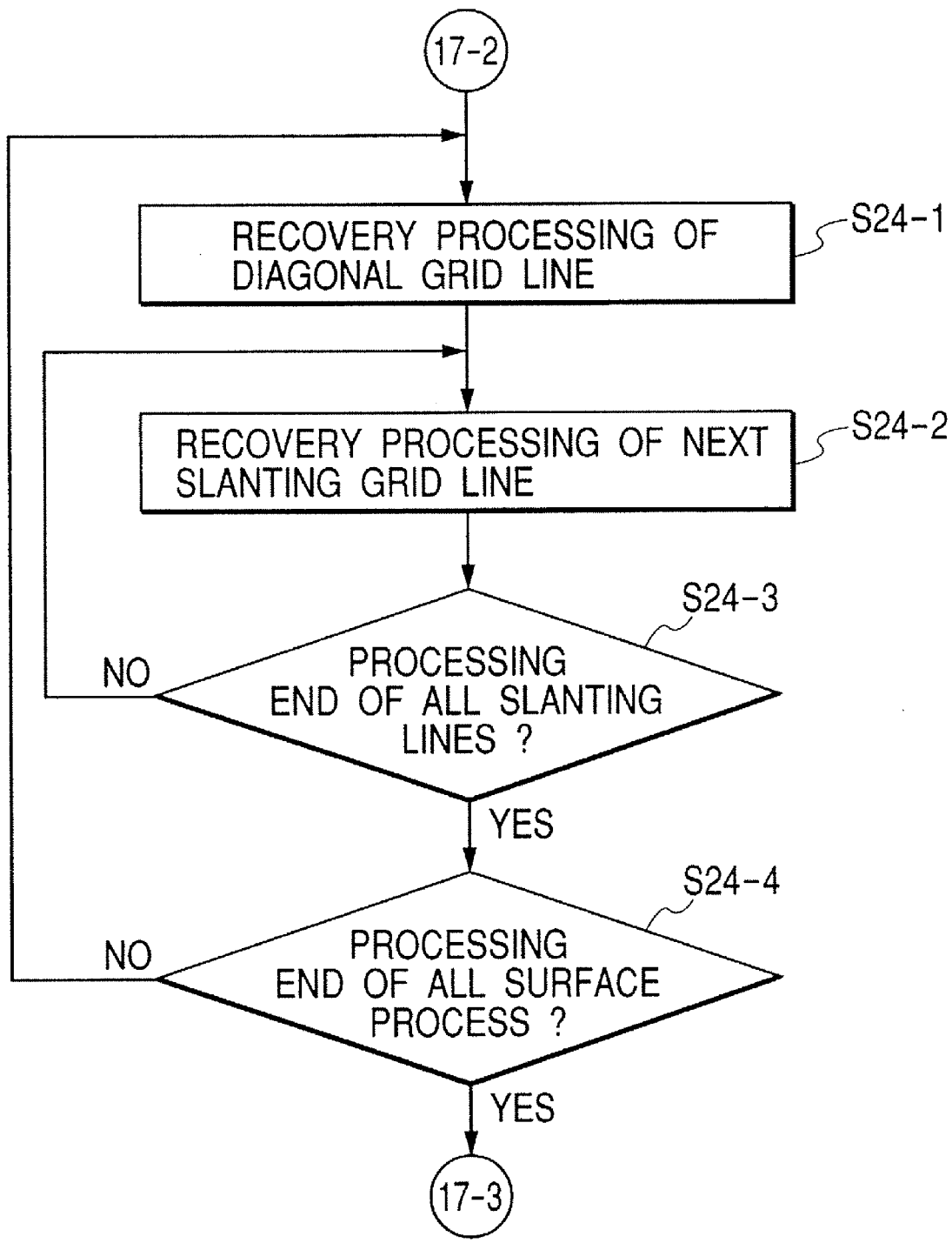
FIG. 24 is a flowchart of a content of a recovery process step S17-3 of a diagonal line.
Figure 25:
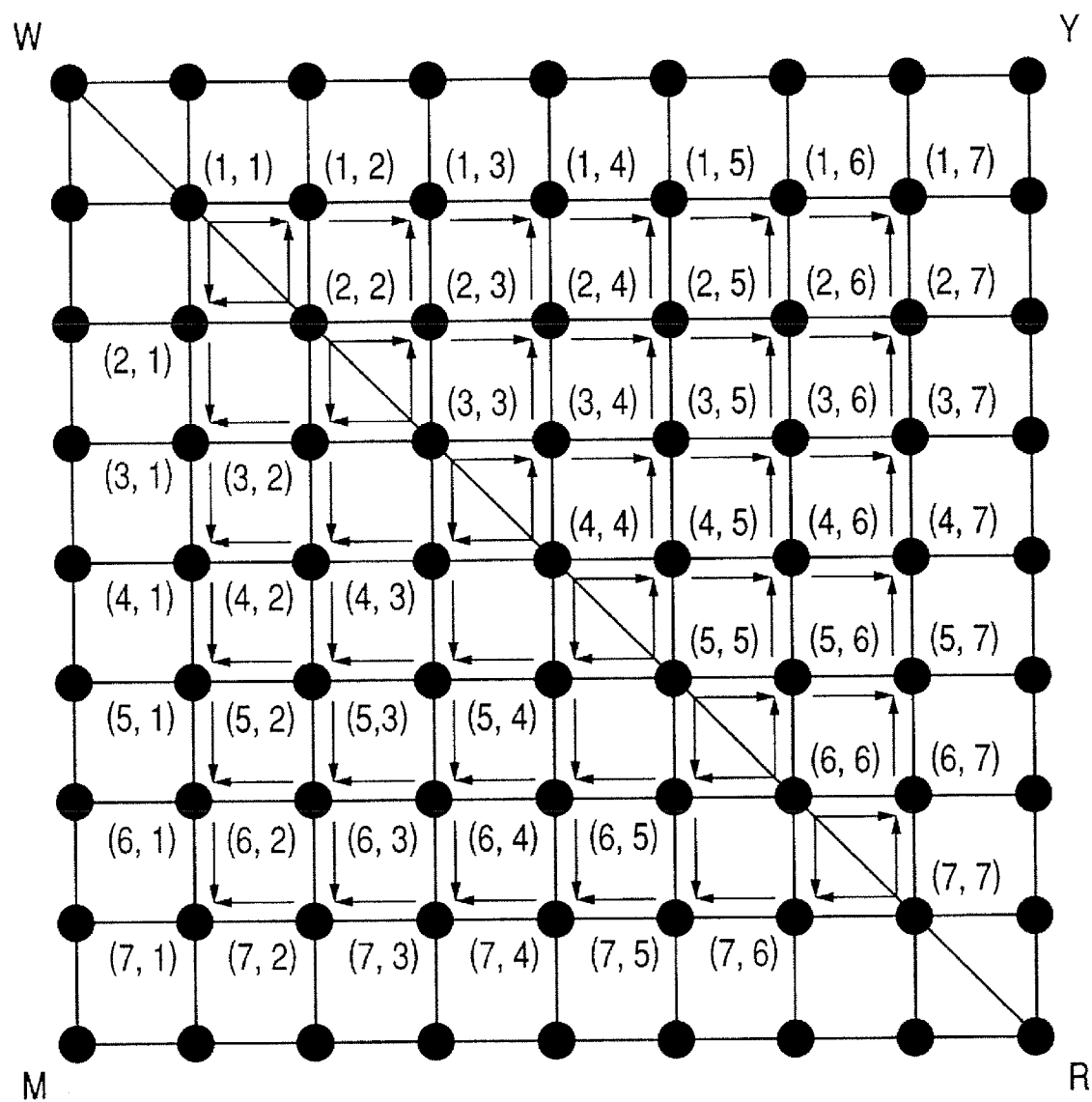
FIG. 25 is an explanatory view of an operation of a recovery process step S24-3 of an adjacent slanting grid line.

FIG. 24 is a flowchart showing the content of the recovery process step S17-3 of the diagonal line, and FIG. 25 is a diagram showing W-Y-M-R of the Gamut surface for describing the operation of the flowchart of FIG. 24. In the example of FIG. 25, the Gamut surface is constituted of nine grid points. Since the outermost grid (outer frame) is not recovery-processed, numbers 1 to 7 are attached only to inner grid points.

Step S24-1 is a recovery process step of a diagonal grid line. First the values stored by the storage process step S17-1 of LUT are written in grid points (1,1), (2,2), ..., (7,7) (these are Rave(1,1), Rave(2,2), ..., Rave(7,7)), and the recovery process of the diagonal grid line is executed. Step S24-2 is a recovery process step of an adjacent slanting grid line. Based on the following recovery equation, the recovery process of the right upper slanting grid line of grid points (1,2), (2,3), ..., (6,7) and the recovery process of the left lower slanting grid line of grid points (2,1), (3,2), ..., (7,6) are executed.

Assuming that the smoothed value in the grid point (i,j) is S(i,j), the recovered value in the grid point (i,j) is R(i,j), the distance from the outer frame is FD(i,j), and a recovery coefficient (positive actual number) is γ, the recovered value R(i,j) of the right upper slanting grid line can be represented by:

$$R(i,j)=FD(i,j)/(FD(i,j)+\gamma)\}\cdot\{Save/Rave\}\cdot S(i,j),$$

wherein $$Save=\{S(i,j-1)+S(i+1,j)\}/2, \text{ and}$$

$$Rave=\{R(i,j-1)+R(i+1,j)\}/2.$$

Moreover, the recovered value R(i,j) of the left lower slanting grid line can be represented by:

$$R(i,j)=FD(i,j)/(FD(i,j)+\gamma)\}\cdot\{Save/Rave\}\cdot S(i,j),$$

wherein $$Save=\{S(i-1,j)+S(i,j+1)\}/2, \text{ and}$$

$$Rave=\{R(i-1,j)+R(i,j+1)\}/2.$$

Step S24-3 is a processing end step of all slanting lines, and a step of judging whether or not the processing of all the slanting lines has ended. If no, the step advances to step S24-2, and the recovery process of the slanting line is successively executed as follows.

right upper: grid points (1,3), (2,4), ..., (5,7)
left lower: grid points (3,1), (4,2), ..., (7,5)
right upper: grid points (1,4), (2,5), ..., (4,7)
left lower: grid points (4,1), (5,2), ..., (7,4)
right upper: grid points (1,5), (2,6), (3,7)
left lower: grid points (5,1), (6,2), (7,3)
right upper: grid points (1,6), (2,7)
left lower: grid points (6,1), (7,2)
right upper: grid point (1,7)
left lower: grid point (7,1)

When the processing of all the slanting lines has ended, that is, if yes, the step advances to step S24-4. Step S24-4 is a processing end step of the whole surface, and is a step of judging whether or not the processing of all the six Gamut surfaces shown in FIG. 18 has ended. If no, the process of the steps S24-1 to S24-3 is repeated. If yes, the step advances to the smoothing process step S17-4 inside Gamut. By the above-described recovery process, the distortion of the color separation table causing the generation of the pseudo contour is removed, and it is possible to recover the value of the diagonal line (line to the primary color from white and line to the secondary color from black) for realizing a maximum chroma which is not to be changed back to an original state.

Figure 26:
FIG. 26 is a diagram showing the matrix which defines the basic frequency characteristics of the smoothing in three dimensions.
Figure 27:
FIG. 27 is a diagram showing the matrix for controlling the smoothing effect degree in three dimensions.

Step S17-4 is a smoothing process step inside Gamut, and a three-dimensional extension of a process step similar to the smoothing process step S17-2 of the Gamut surface is executed. FIGS. 26 and 27 show coefficients for executing the three-dimensional smoothing process. Assuming that the value of the noted grid point is X(i,j,k), and the smoothed value of the noted grid point is X'(i,j,k), X'(i,j,k) is represented as follows:

$$X'(i, j, k) = \{\alpha \cdot a11 \cdot X(i-1, j-1, k-1) + \alpha \cdot a12 \cdot X(i-1, j, k-1) +$$
$$\alpha \cdot a13 \cdot X(i-1, j+1, k-1) + \alpha \cdot a14 \cdot X(i, j-1, k-1) +$$
$$\alpha \cdot a15 \cdot X(i, j, k-1) + \alpha \cdot a16 \cdot X(i, j+1, k-1) +$$
$$\alpha \cdot a17 \cdot X(i+1, j-1, k-1) + \alpha \cdot a18 \cdot X(i+1, j, k-1) +$$
$$\alpha \cdot a19 \cdot X(i+1, j+1, k-1) + \alpha \cdot a21 \cdot X(i-1, j-1, k) +$$
$$\alpha \cdot a22 \cdot X(i-1, j, k) + \alpha \cdot a23 \cdot X(i-1, j+1, k) +$$
$$\alpha \cdot a24 \cdot X(i, j-1, k) + \beta \cdot a25 \cdot X(i, j, k) + \alpha \cdot a26 \cdot X(i, j+1, k) +$$
$$\alpha \cdot a27 \cdot X(i+1, j-1, k) + \alpha \cdot a28 \cdot X(i+1, j, k) +$$
$$\alpha \cdot a29 \cdot X(i+1, j+1, k) + \alpha \cdot a31 \cdot X(i-1, j-1, k+1) +$$
$$\alpha \cdot a32 \cdot X(i-1, j, k+1) + \alpha \cdot a33 \cdot X(i-1, j+1, k+1) +$$
$$\alpha \cdot a34 \cdot X(i, j-1, k+1) + \alpha \cdot a35 \cdot X(i, j, k+1) +$$
$$\alpha \cdot a36 \cdot X(i, j+1, k+1) + \alpha \cdot a37 \cdot X(i+1, j-1, k+1) +$$
$$\alpha \cdot a38 \cdot X(i+1, j, k+1) + \alpha \cdot a39 \cdot X(i+1, j+1, k+1)\}/\text{sum}$$
$$2 \dots (2), \text{ wherein for } \beta, \text{sum2}, \beta = 2 -$$
$$\alpha,$$
$$\text{and } 0 \leq \alpha \leq 1 \cdot \text{sum2} = \alpha \cdot a11 +$$
$$\alpha \cdot a12 +$$
$$\alpha \cdot a13 +$$
$$\alpha \cdot a14 +$$
$$\alpha \cdot a15 + \alpha \cdot a16 +$$
$$\alpha \cdot a17 + \alpha \cdot a18 +$$
$$\alpha \cdot a19 + \alpha \cdot a21 +$$
$$\alpha \cdot a22 + \alpha \cdot a23 + \alpha \cdot a24 +$$
$$\beta \cdot a25 + \alpha \cdot a26 + \alpha \cdot a27 +$$
$$\alpha \cdot a28 + \alpha \cdot a29 + \alpha \cdot a31 +$$
$$\alpha \cdot a32 + \alpha \cdot a33 + \alpha \cdot a34 + \alpha \cdot a35 +$$
$$\alpha \cdot a36 + \alpha \cdot a37 + \alpha \cdot a38 + \alpha \cdot a39$$

Moreover, the distance FD(i,j) from the outer frame in the noted grid point (i,j), and the value ZD(i,j) of the distance table from the zero boundary are obtained in a three-dimensional space, and the smoothing amount control parameter α is obtained by the following equation:

α=Min[FrameDist[FD(i,j)], ZeroDist[ZD(i,j)]], wherein Min[A,B] indicates a small value of A, B. Step S17-5 is the recovery process step of the gray line, and the process step similar to the recovery process step S17-3 of the diagonal line is three-dimensionally executed. As a result, the color separation table into black from white is recovered regardless of the change by the smoothing.

As described above, in the present embodiment, the two-dimensional and three-dimensional smoothing and recovery processes are combined and used. Thereby, without changing the value of the gray line (color separation table 1) which must not be changed or the line which defines the maximum chroma (color separation tables 2, 3), it is possible to remove the distortion of the color separation table caused by dividing the color space into six tetrahedron areas and subjecting each area to the interpolation process, or the distortion caused during the internal interpolation process. Therefore, the suppression of the pseudo contour of the reproduced image caused by the distortion of the color separation table is achieved.

Furthermore, when the smoothing process is executed, the smoothing amount is controlled in accordance with the distance from the zero boundary of the gray component or dark ink. Therefore, without changing the gray component or dark ink replacement starting point, or without impairing the smoothness in the gray component or dark ink replacement start, the smoothing process of the color separation table can be realized.

That is, the conditions that 1) the value of the gray line (color separation table 1) or the line defining the maximum chroma (color separation tables 2, 3) is not changed, 2) the gray component or dark ink replacement starting point is not changed, and 3) the smoothness in the gray component or dark ink replacement start is not impaired are satisfied, while it is possible to remove the distortion of the color separation table causing the generation of the pseudo contour.

Second Embodiment

In the first embodiment, four colors CMYK are used as the ink colors of the printer. However, even in a printer of six colors in total in which light and dark inks are used in cyan, magenta, the smoothing process of the color separation table can easily be realized simply by adding two ink colors.

Figure 15:
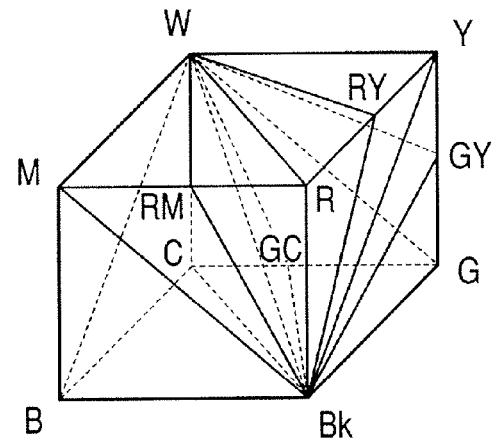
FIG. 15 is an explanatory view of division of the input cube into eight tetrahedrons with the use of red and green color inks other than CMYK.
Figure 16:
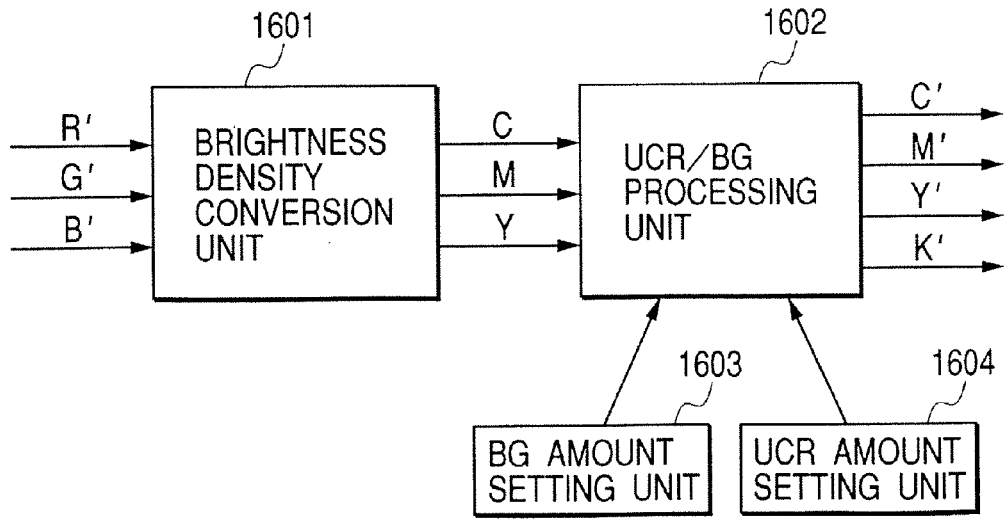
FIG. 16 is an explanatory view of a process of separation into coloring material colors of a conventional color printer.

Moreover, for color inks other than CMYK, such as red and green, as shown in FIG. 15, RM between R and M, RY between R and Y, GY between G and Y, and GC between G and C are newly set, and ten tetrahedrons in total are defined including a tetrahedron W, C, B, Bk, tetrahedron W, B, M, Bk, new tetrahedron W, M, RM, Bk, tetrahedron W, RM, R, Bk, tetrahedron W, R, RY, Bk, tetrahedron W, RY, Y, Bk, tetrahedron W, Y, GY, Bk, tetrahedron W, GY, G, Bk, tetrahedron W, G, GC, Bk, and tetrahedron W, GC, C, Bk. Even when the ink color increases, the smoothing process of the color separation table for the six-color printer can easily be realized.

Third Embodiment

In the first embodiment, the RGB color space is used as the input color space of the ink color separation table which defines the color reproduction range of the color printer, but the space is not limited to RGB, and any space can be used as long as the color reproduction range of the printer can three-dimensionally be defined by three variables such as CMY and abc.

Other Embodiments

The present invention is constituted by a program code for realizing the embodiment functions in the apparatus or system connected to various devices so that the various devices are operated so as to realize the functions of the above-described embodiments, and means for supplying the program code to a computer such as a storage medium in which the program code is stored.

Examples of the storage medium in which the program code is stored can include a floppy disk, hard disk, optical disk, optical magnetic disk, CD-ROM, magnetic tape, non-volatile memory card, and ROM for use.

When the computer executes the supplied program code, the functions of the above-described embodiments are realized. Additionally, the program code cooperates with an operating system (OS) operating in the computer, or another application software, and the functions of the above-described embodiments are realized. Even in this case, needless to say, the program code is included in the embodiment of the present invention.

Furthermore, after the supplied program code is stored in a memory disposed in a function expansion board of the computer or a function expansion unit connected to the computer, CPU disposed in the function expansion board or the function storage unit executes a part or the whole of the actual processing based on the instruction of the program code, and the functions of the above-described embodiments are realized by the processing. Even this case is needless to say included in the present invention.

As described above, the two-dimensional and three-dimensional smoothing and recovery processes are combined and used. Thereby, without changing the value of the gray line (color separation table 1) which must not be changed or the line which defines the maximum chroma (color separation tables 2, 3), it is possible to remove the distortion of the color separation table caused by dividing the color space into six tetrahedron areas and subjecting each area to the interpolation process, or the distortion caused during the internal interpolation process. The distortions of the color separation tables are removed, and thereby it is possible to solve the problem that the pseudo contour is generated in the reproduced image.

Moreover, when the smoothing process is executed, the smoothing amount is controlled in accordance with the distance from the zero boundary of the gray component or dark ink. Therefore, without changing the gray component or dark ink replacement starting point, or without impairing the smoothness in the gray component or dark ink replacement start, the smoothing process of the color separation table can be realized.

According to the present invention, since the table obtained by the interpolation process is smoothed, the image deterioration by the generation of the pseudo contour can be inhibited. Moreover, without changing the first color separation table to black from white, second color separation table to the primary or secondary color from the white, and third color separation table to black from the primary or secondary color, the value obtained by the interpolation is smoothed. Therefore, without changing the gray line or the line for defining the maximum chroma, the pseudo contour of the reproduced image can be suppressed. Moreover, the effect degree of the smoothing is controlled in accordance with the distance from the zero boundary or the outer frame, and the smoothing is much controlled in the dark ink or gray component replacement start. Thereby, without changing the point of the gray component or dark ink replacement, the smoothing is possible.

What is claimed is:

1. A table creation method of creating a table for performing color conversion of an input color signal, comprising the steps of:
    operating an image forming apparatus to perform steps as follows:
    performing an interpolation process on data corresponding to grid points of a color space of the input color signal; and
    subjecting said created table to a smoothing process in accordance with a distance from an outer frame of said color space and a distance from a zero boundary without changing a maximum chroma or gray line to create a table.

2. The table creation method according to claim 1, wherein said table creation step includes the steps of: recovering the maximum chroma and gray line of said smoothing.

3. The table creation method according to claim 1, wherein said interpolation process step includes the steps of: dividing said color space into a plurality of areas and performing the interpolation process for each area.

4. The table creation method according to claim 1, further comprising the steps of: setting a gray component replacement point and creating a table of said gray line based on the gray component replacement point before said interpolation process step.

5. The table creation method according to claim 1, wherein said smoothing step includes the steps of: smoothing the surface of said color space and smoothing the inside of the color space.

6. The table creation method according to claim 1, wherein said smoothing step includes the steps of: changing a strength in accordance with the distance from the outer frame of said color space and the distance from the zero boundary.

7. The table creation method according to claim 1, further comprising the steps of: performing said smoothing a plurality of times.

8. The table creation method according to claim 1, further comprising the steps of: performing a two-dimensional filtering with respect to data to be smoothed and smoothing the surface of said color space; and performing a three-dimensional filtering with respect to data to be smoothed and smoothing the inside of said color space.

9. The table creation method according to claim 1, wherein said plurality of areas include six areas, when a recording apparatus using said created table uses a four-color recording material, and include ten areas, when said recording apparatus uses a six-color recording material.

10. A computer-readable storage medium in which a program is stored that is executable by an image forming apparatus for creating a table for performing color conversion of an input color signal, the program executing a procedure comprising the steps of:

performing an interpolation process on data corresponding to grid points of a color space of the input color signal; and subjecting said created table to a smoothing process in accordance with a distance from an outer frame of said color space and a distance from a zero boundary without changing a maximum chroma or gray line to create a table.

11. A program stored in a computer-readable storage medium for executing an image forming apparatus which creates a table for performing color separation into coloring material colors in an image forming apparatus, the program executing a procedure comprising the steps of:

creating a first color separation table into black from white;

creating a second color separation table into primary and secondary colors from said white;

creating a third color separation table into black from said primary and secondary colors;

performing an interpolation process based on said first, second, and third color separation tables; and smoothing the table obtained by said interpolation process to create the table.

12. A table creation apparatus which creates a table for performing color separation into coloring material colors in an image forming apparatus, comprising:

means for creating a first color separation table into black from white;

means for creating a second color separation table into primary and secondary colors from said white;

means for creating a third color separation table into black from said primary and secondary colors;

means for performing an interpolation process based on said first, second, and third color separation tables; and means for smoothing the table obtained by said interpolation process to create the table.

* * * * *